United States Patent [19]

Hatase et al.

[11] Patent Number: 4,861,146
[45] Date of Patent: Aug. 29, 1989

[54] VARIABLE FOCAL LENS DEVICE

[75] Inventors: Takayuki Hatase, Yokohama; Yoshimi Ohno, Kawasaki, both of Japan

[73] Assignee: Ricoh Company, Ltd., Tokyo, Japan

[21] Appl. No.: 146,394

[22] Filed: Jan. 21, 1988

[30] Foreign Application Priority Data

Jan. 24, 1987 [JP] Japan .................................. 62-13345
May 22, 1987 [JP] Japan .................................. 62-123877
May 26, 1987 [JP] Japan .................................. 62-128775
May 26, 1987 [JP] Japan .................................. 62-128776

[51] Int. Cl.$^4$ ............................................. G02B 7/11
[52] U.S. Cl. ..................................... 350/429; 354/402
[58] Field of Search ................ 350/429, 255; 354/400, 354/402

[56] References Cited

U.S. PATENT DOCUMENTS 4,161,756  7/1979  Thomas ................................ 350/429
4,705,380 11/1987  Yamamoto et al. ................. 354/402

Primary Examiner—Bruce Y. Arnold
Assistant Examiner—Loha Ben
Attorney, Agent, or Firm—Oblon, Spivak, McClelland, Maier & Neustadt

[57] ABSTRACT

A variable focal lens device having an optical system comprising a variable power lens group and a focusing lens group disposed on one identical optical axis in which a deviation of a focusing position is resulted with an identical object when the focusing lens group is set at a predetermined focusing position from a nearest position to an infinite position on the optical axis corresponding too an object distance from a nearest distance to an infinite distance and then moving the variable power lens group along the optical axis thereby renewing an entire system focal length of the variable power optical system from a first focal length to a second focal length.

10 Claims, 18 Drawing Sheets

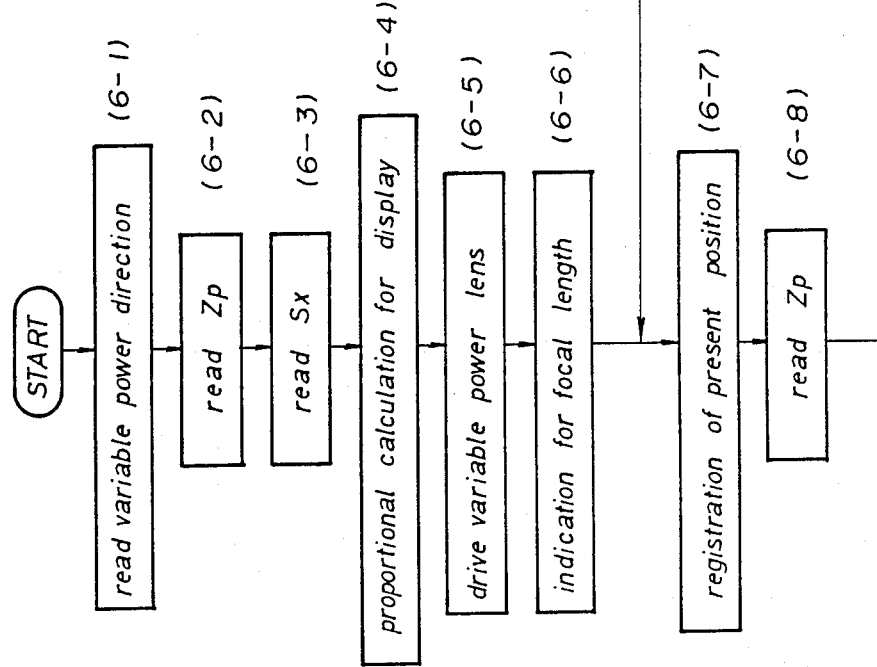

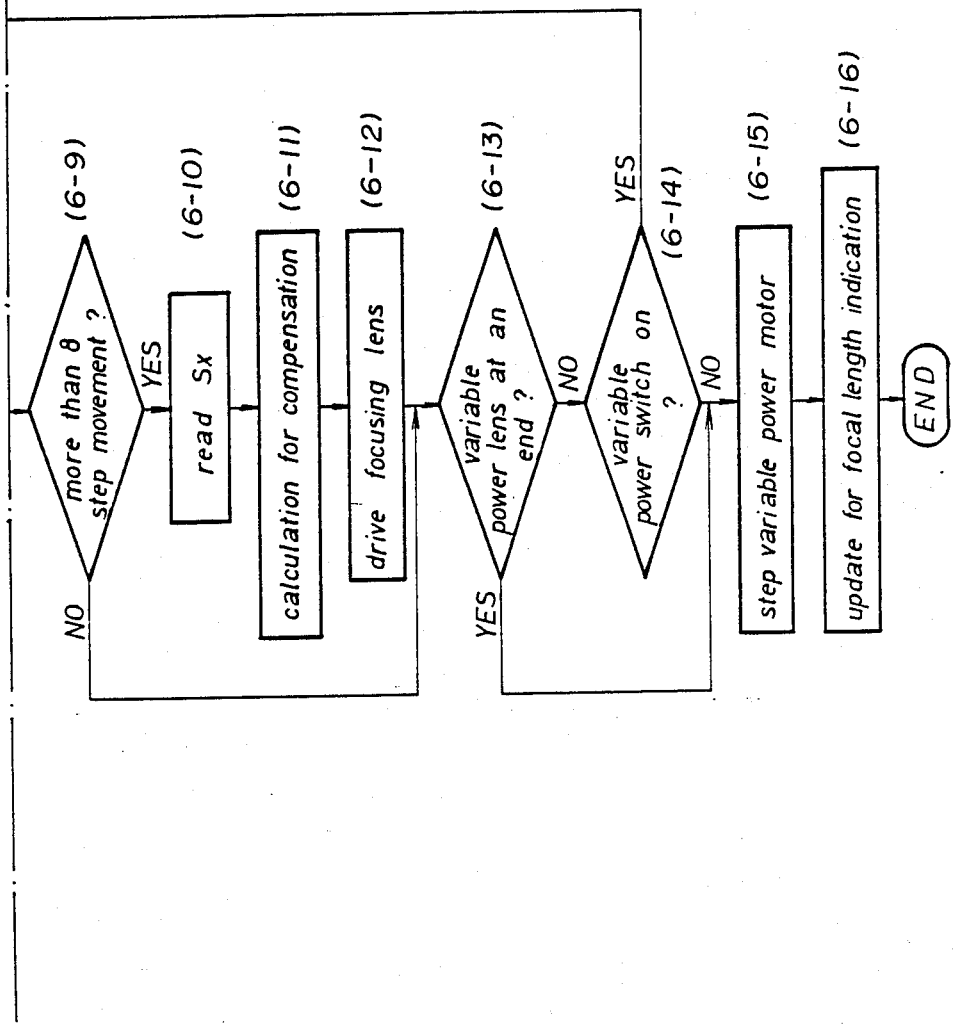

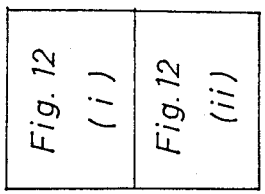
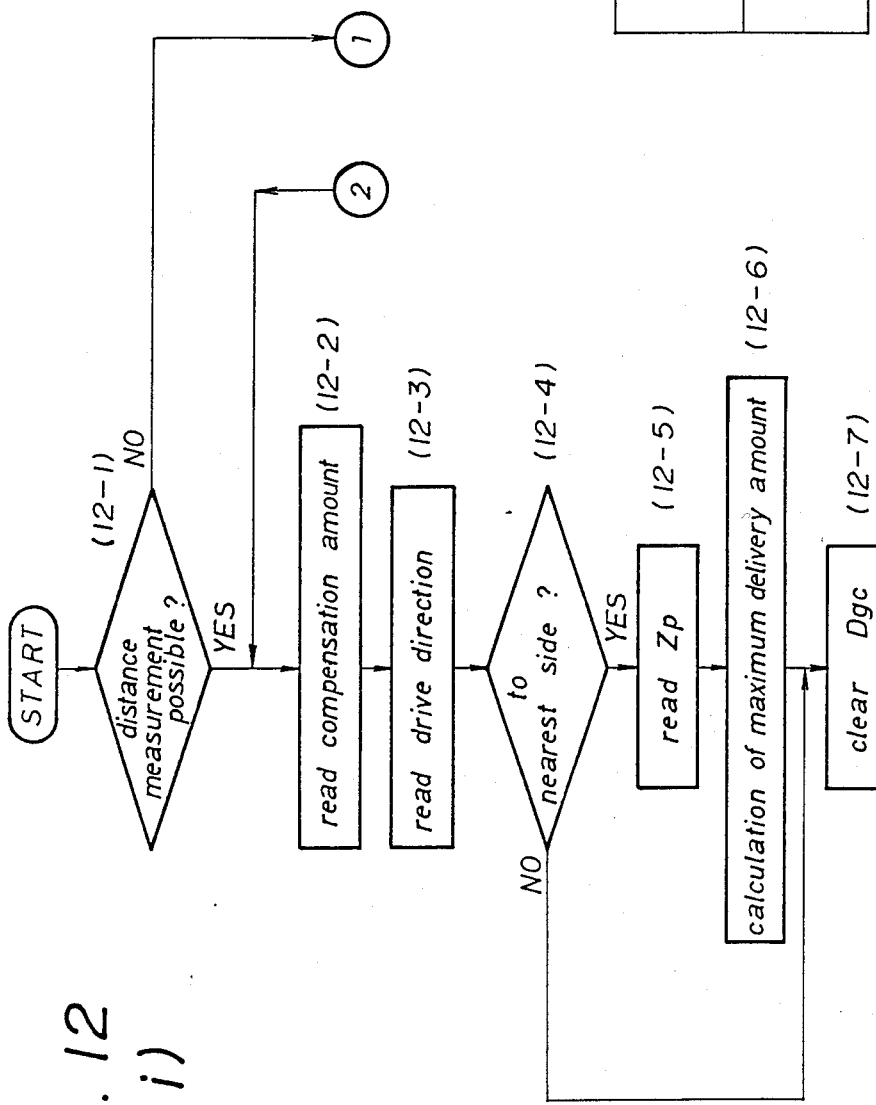
Fig. 12 (i)

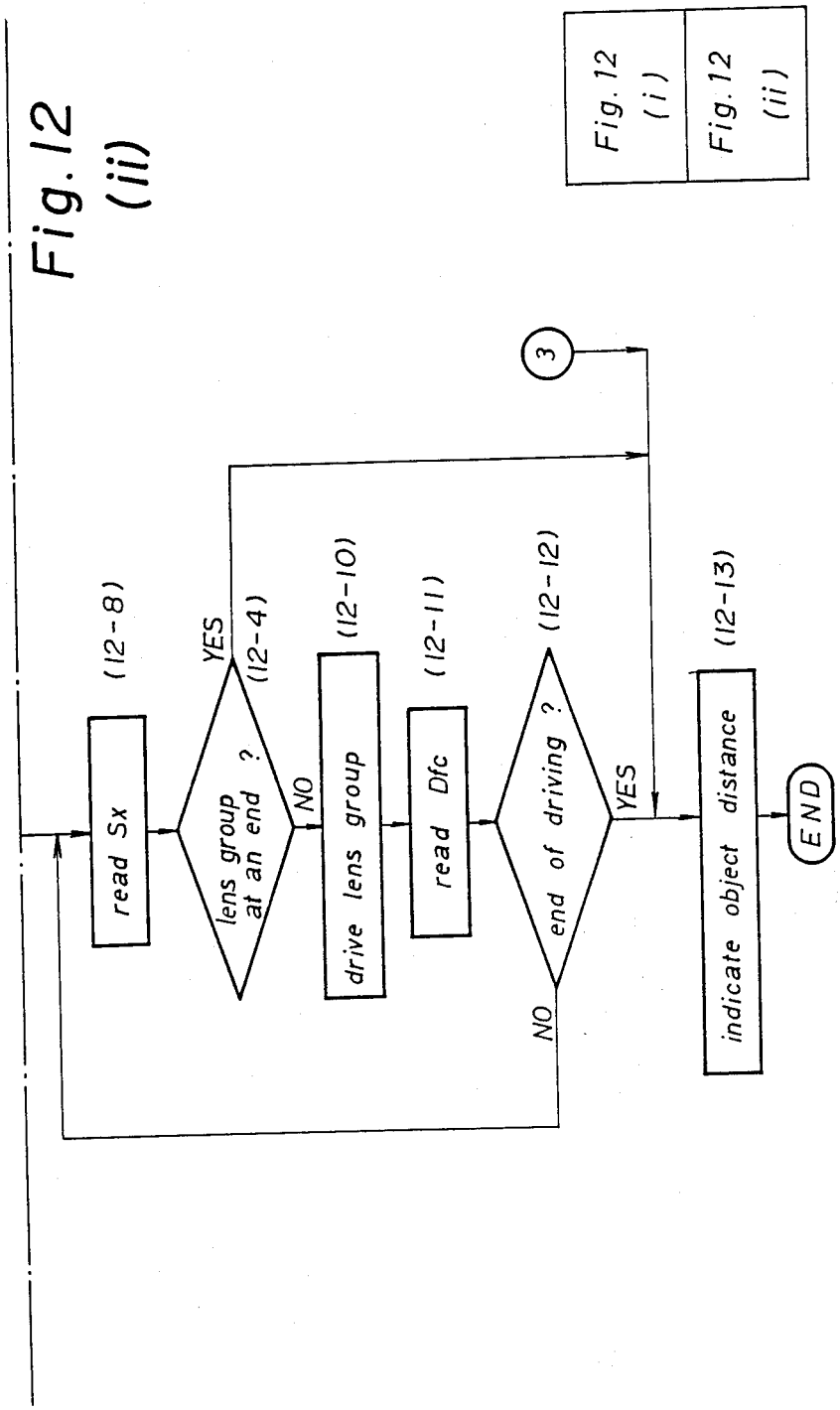

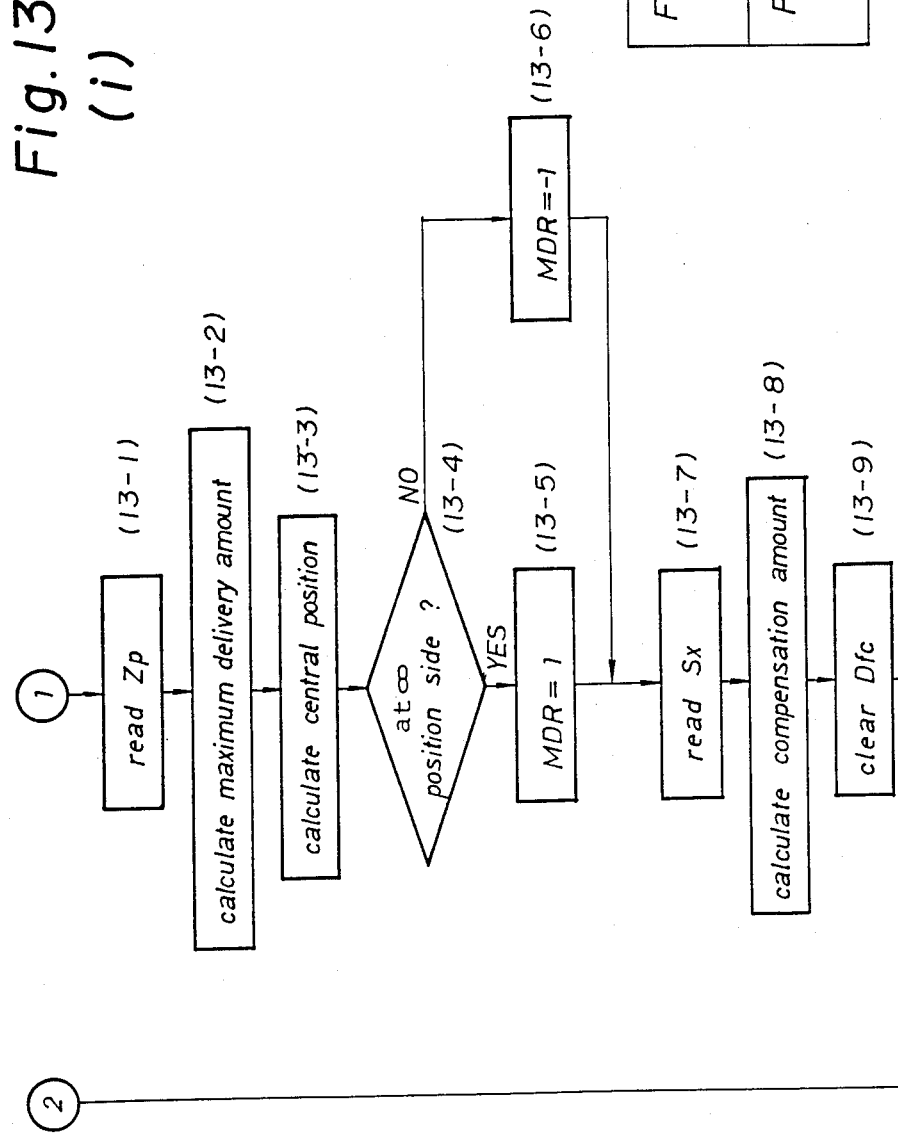

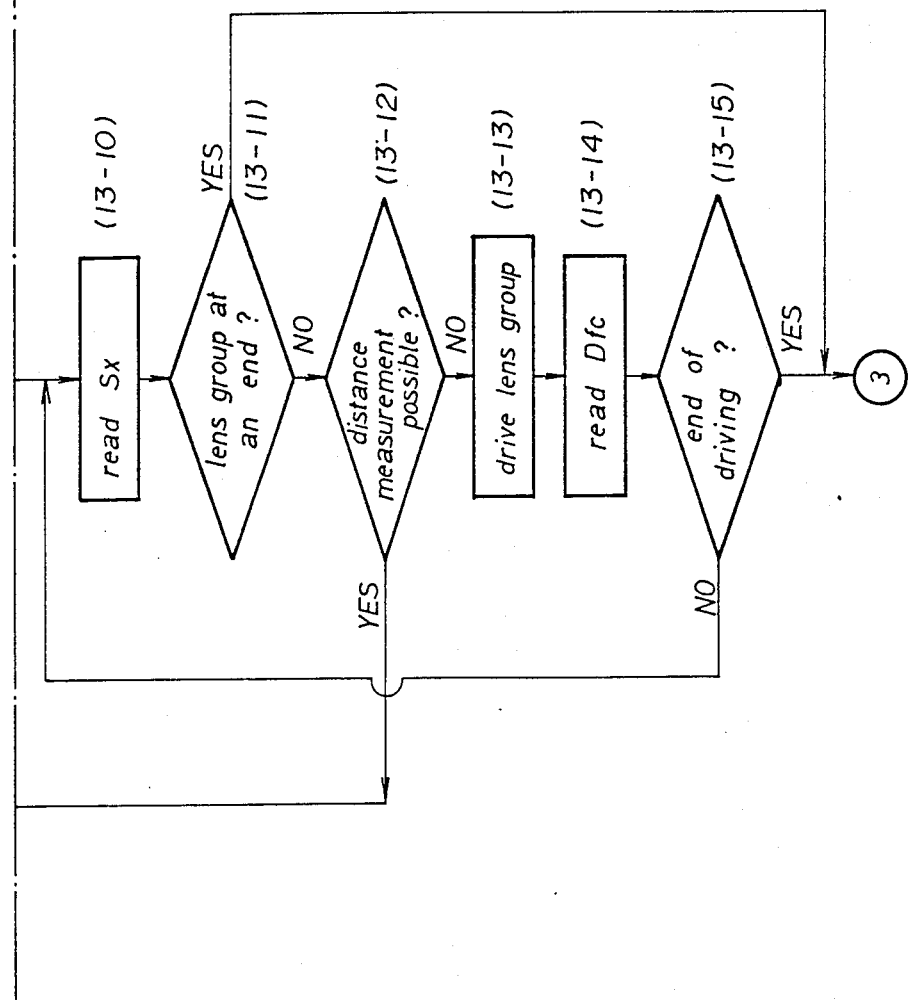
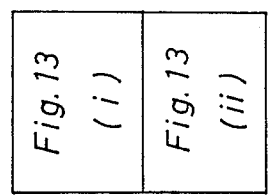

(a)

VARIABLE FOCAL LENS DEVICE

BACKGROUND OF THE INVENTION

The present invention concerns a variable focal lens device comprising a variable power lens group and a focusing lens group for use in cameras, which calculates an amount of change in the focal length resulted upon positioning the variable power lens group to obtain a desired magnifying power and conducts a positional compensation for the focusing lens group automatically depending on the amount of change.

Zoom lens system can provide a satisfactory operability because it does not require to focus on an object on every zooming operation since the zooming operation causes no positional image deviation (so-called shift of focus or out of focus). On the other hand, the focusing operation in a single lens reflex type for example, needs skillful technic since the view is less bright as compared with that of the single focus lens. Since the foregoing problem has been dissolved with the recent development in the automatic focus control in cameras, users can concentrate their attention only to the decision of a composition of a picture, which improves the operability significantly.

Focusing in the zoom lens is generally conducted by moving a focusing lens group of a variable power optical system. The zoom lens has an advantage that the amount of the movement of the focusing lens group is substantially constant with an identical object distance for the entire zoom zone (this is referred to as "equal amount movement" hereinafter), and accordingly, an advantage that the graduation for the object distance may not necessarily be changed depending on the zooming. However, in the zoom lens of an inner focusing system or rear focusing system, there has been a problem that the lens constitution becomes complicated, and in addition, the moving amount (delivery amount) of the focusing lens group is increased unnecessarily on the wide angle side if the optical design is conducted under the condition of realizing the equal amount movement. Further, this also results in a problem of enlarging the outer diameter of the lens and increasing the weight of the lens and the lens barrel.

The present invention has been made in view of the foregoing situations and object thereof is to provide a variable focal lens system for use in cameras, which is simple and compact in the mechanism, since it does not require to make the amount of movement of the focusing lens group identical with that of the variable power lens group on the same optical axis.

The foregoing object of the present invention can be attained by a variable focal lens device having an optical system comprising a variable power lens group and a focusing lens group disposed on one identical optical axis in which a deviation of a focusing position is resulted with an identical object when the focusing lens group is set at a predetermined focusing position from a nearest position to an infinite position on the optical axis corresponding to an object distance from a nearest distance to an infinite distance and then moving said variable power lens group along the optical axis thereby renewing an entire system focal length of said variable power optical system from a first focal length to a second focal length wherein said device comprises;

a focal length detection means for detecting said entire system focal length, a focusing lens group position detection means for detecting a position of said focusing lens group on said optical axis, a maximum delivery amount calculation means for receiving an output from said focal length detection means and calculating a delivery amount of said focusing lens group from said infinite position to said nearest position for said focal length, a proportional constant calculation means for receiving outputs from said maximum delivery amount calculation means and from said focusing lens group position detection means respectively and calculating a ratio between said outputs, a focusing compensation calculation means for receiving outputs from said proportional constant calculation means, from said maximum delivery amount calculation means and from said focusing lens group position detection means respectively, and calculating an amount of deviation of the focusing position from the focusing position resulted from the renewal of said entire system focal length as a compensation value, a focusing drive means for driving said focusing lens group, a moving amount monitor means for generating a signal corresponding to the moving amount of said focusing lens group, a focusing control means for receiving outputs from said moving amount monitor means and from said focusing compensation calculation means respectively and driving said focusing lens group to said focusing position, a variable power drive means for driving the variable power lens group, and a variable power control means for receiving a start signal from a start means and controlling said variable power drive means, the deviation of the focusing position due to the renewal of the entire system focal length of said optical system being automatically compensated.

The foregoing object of the present invention can be attained also by a variable focal lens device having an optical system comprising a variable power lens group and a focusing lens group disposed on an identical optical axis in which a deviation of a focusing position is resulted with an identical object when the focusing lens group is set to a predetermined focusing position from a nearest position to an infinite position on the optical axis corresponding to an object distance from a nearest distance to an infinite distance and then moving said variable power lens group thereby renewing an entire system focal length of the optical system from a first focal length to a second focal distance, wherein the device comprises;

a focal point detection means for detecting a focal point adjusting state of said focusing lens group to said object, a focusing control means for driving the focusing lens group so as to focus on the object based on an output from the focal point detection means, a variable power lens group position detection means for detecting a position of said variable power lens group on said optical axis corresponding to said entire system focal length, a focusing lens group position detection means for detecting a position of said focusing lens group on said optical axis corresponding to said object distance, a central position calculation means for calculating a central position between said nearest position and said infinite position at the focal length thereby outputting a signal corresponding to the central position when detecting a focal point by said focal point detection means is impossible, and a judging means for judging a relative relationship between the position of said focusing lens group and said central position based on an output from said focusing lens group position detection means and an output from said central position calculation means, thereby instructing said focusing control means to drive said focusing lens group toward a near distance side in case said focusing lens group is situated on a far distance side with respect to said central position, while toward a far distance side in case said focusing lens group is situated on a near distance side with respect to said central position.

The present invention will be described more specifically by way of preferred embodiments referring to the accompanying drawings but it should be noted that the present invention is not limited only to these examples but various modifications are possible.

FIG. 6 is a flow chart for illustrating the operation sequence of the embodiment shown in FIG. 1;

FIGS. 7 and 8 are, respectively, for the explanation of the theory of the conventional focusing system in which FIG. 7 is a graph schematically illustrating the constitution of the front focusing type optical system, while FIG. 8 is a graph schematically illustrating the constitution of the inner focusing type optical system;

FIGS. 12 and 13 are flow charts showing the operation sequence of the embodiment shown in FIG. 9 in which FIG. 12 shows the automatic focusing operation and FIG. 13 shows the drive mode judging operation respectively;

FIGS. 17 through 21 are enlarged views for each of the portion in FIG. 16, in which FIG. 17 illustrates the cam shape of the cam grooves in the fixed cell and that in the variable power cells, as well as the relationship therebetween;

FIG. 18(*a*) is a plan view illustrating, in an enlarged scale, a connection portion between the variable power cell and the variable power transmission cell;

FIG. 18(*b*) is a cross sectional view taken along line A-A' in FIG. 18(*a*);

FIG. 19 is a plan view illustrating the cam shape of the fixed cell and that of the variable power transmission cell, as well as the relationship therebetween;

FIG. 20 is a plan view illustrating the shape of the cam and the directional relationship with the optical axis is the focus cell;

FIG. 21 is a plan view illustrating the respective cam shapes of the focus cell, fixed cell and variable power transmission cell;

Prior to the specific explanation for the embodiment according to the present invention referring to the accompanying drawings, explanation will be made to the theory that constitutes the ground of the present invention.

The focusing operation for the zoom lens is generally conducted by the movement of a focusing lens group disposed at a center portion of the optical system. The zoom lens has an advantage that the moving amount of the focusing lens group is substantially identical over the entire zoom region with the identical object distance (hereinafter referred to as "equal amount movement") and, accordingly, an advantage that the change for the scale of the object distance is not required depending on the zooming. However, in the zoom lens of an inner focusing system or rear focusing system, there has been a problem that the lens constitution becomes complicated and that the moving amount (delivery amount) of the focusing lens group on the wide angle side is increased unnecessarily if the optical design is conducted under the condition of realizing the equal amount movement described above, although this may be different depending on the lens constitution of the optical system. That is, in comparison with a single focal point lens, the moving amount for a wide angle (short focal point) lens of 35 mm may be about 1 mm and the moving amount for the focusing lens group is 16 mm in a 140 mm telephoto lens, for instance, whereas a 16 mm stroke is also required on the wide angle side in the case of a zoom lens at four times of zoom ratio because of the condition for the equal amount movement. Further, this also leads to the enlargement of the outer diameter of the lens to bring about a problem that the weight of the lens and the lens barrel is increased.

Then, explanation will be made to the focusing system which is an important factor in the automatic focusing.

(i) Front Focusing System

The system has most popularly been employed in the zoom lens, in which the focusing is conducted by the delivery of the front group disposed on the side of the object in the optical system.

Figure 7:
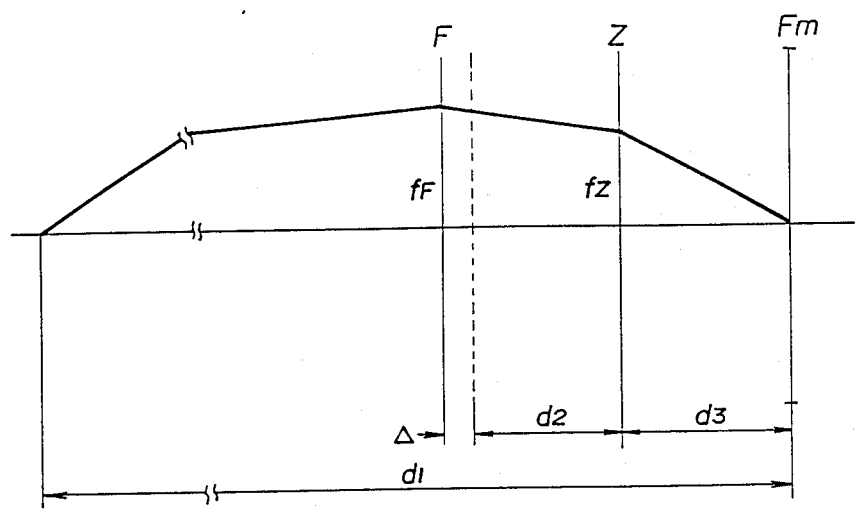

FIG. 7 shows the constitution for the front focusing system approximated with thin walled lenses. In FIG. 7, are shown focusing lens group F, zoom lens group Z, film plane Fm, object distance $d_1$, distance $d_2$ between both of the lens groups F and Z when the object distance $d_1$ is just focused on the film plane Fm at infinity, distance $d_3$ from the zoom lens group Z to the film plane Fm, focal length fF of the focusing lens group F, focal length fZ for the zoom lens group Z and the moving amount $\Delta$ of the focusing lens group. The focusing lens group F and the zoom lens group Z are moved in the direction of the optical axis by the zooming operation and the focusing group F is moved in the direction of the optical axis also by the focusing operation.

When the lens constitution of the front focusing system having thus been constituted is approximated with thin-walled lenses, the following equation (4) can be obtained $$\Delta^2 + G_1(d_1, d_2, d_3, fZ, fF)\Delta + G_2(d_1, d_2, d_3, fF, fZ) = 0 \quad (4)$$

Then, assuming that the entire system focal length of the optical system shown in FIG. 7 is f and that the object distance $d_1$ is much greater than the distance $d_2$ and the distance $d_3$, it is known that the equation (5) is established.

$$\frac{\partial \Delta}{\partial d_3}\bigg|_{d_1=\infty} \propto \left(\frac{f_F}{f}\right)^2 \quad (5)$$

Further, if the following equation (6) is not a function for the entire system focal length f, the above-mentioned equal amount movement is realized:

$$\frac{\partial \Delta}{\partial d_1} = \frac{\partial \Delta}{\partial d_3} \cdot \frac{\partial d_3}{\partial d_1} \quad (6)$$

While on the other hand, since the second term on the right side of the equation (6) can be rewritten optically by the Newton's equation as:

$$\frac{\partial d_3}{\partial d_1} \propto f^2 \quad (7)$$

in the case of front focusing system, it can be expressed by the following equation (8):

$$\frac{\partial \Delta}{\partial d_1} \propto f_F^2 \quad (8)$$

That is, if the focusing lens group F is so constituted that the focal length fF of the focusing lens group F does not change by the variable power operation, the right side of the equation (8) becomes a constant and the equal amount movement is realized. As has been explained previously, the front focusing system is generally utilized in the zoom lens, because the equal amount movement can be realized by itself with no requirement for any particular design. However, in the case of using the front focusing system to a high magnification zoom lens of about: f=35–135 mm, there occur problems difficult to be coped with such as unnecessary large moving amount of the focusing lens group F on the wide angle side, variation of the aberration due to the change in the object distance and increase in the lens outer diameter for the focusing lens group F for securing the marginal illumination. Further, in the zoom lens with the focal length of about 35–135 mm as described above, there are introduced significant problems that the constitution of the lens and the lens barrel is complicated, as well as that the control speed is reduced for controlling the focusing lens group of the large diameter (that is, great weight as well) by way of the complicated lens barrel structure unless a motor having a large torque is used. Furthermore, although there has already been proposed and put to practical use a mechanical compensation method using a cam for the control means therefor, this method introduces another problem that the structure of the lens barrel becomes more complicated.

(ii) Inner Focusing System

The inner focusing system has gradually been used in recent years, because the lens group situated nearer to the camera main body is driven, for example, in a single lens reflex camera incorporating a focusing motor on the side of the camera main body, and this provides a constitutional advantage for the driving mechanism. Further, since the outer diameter of inner lens and, that is, the weight thereof is generally smaller than that of the lens on the object side in the optical system of the zoom lens, there are merits that the strength for each of the components in the driving mechanism can be reduced, the structure can be simplified, the mechanical load on the driving mechanism can be reduced and the time required for attaining the focusing can be reduced. Furthermore, the inner focusing system lens has a characteristic also from an optical point of view that the moving amount for the focusing is small.

Figure 8:
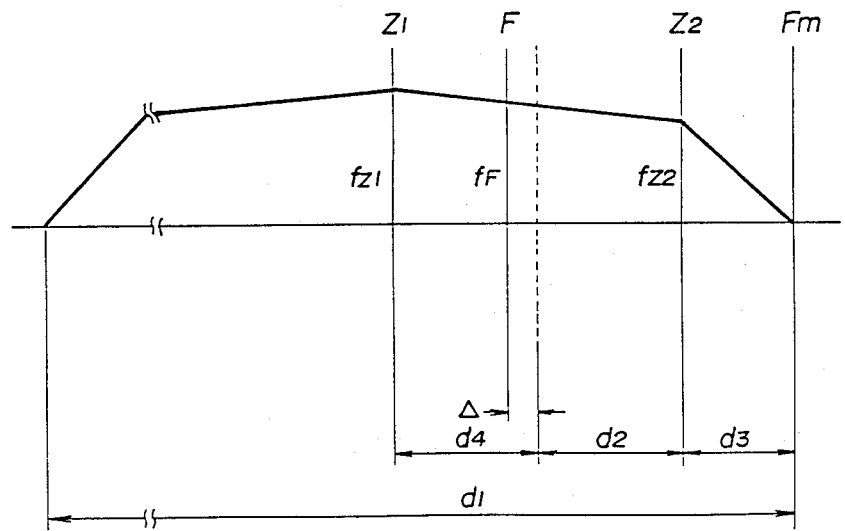

FIG. 8 shows the constitution of the inner focusing system zoom lens, in which are shown front zoom lens group $Z_1$, focusing lens group F, rear zoom lens $Z_2$, film plane Fm, object distance $d_1$, distance $d_2$ between the focusing lens group F and the rear zoom lens group $Z_2$ in a case where the focus is taken on the film plane Fm at $d_1 = \infty$, distance $d_3$ from the rear zoom lens group $Z_2$ to the film plane Fm, distance $d_4$ between $Z_1$ and F when the focus is taken on the film plane at $d_1 = \infty$, moving amount $\Delta$ of the focusing lens group F, focal length $fz_1$ of the front zoom lens group $Z_1$, focal length $fz_2$ of the rear zoom lens group $Z_2$ and focal length $f_F$ of the focusing lens group. The three lens groups $Z_1$, $Z_2$ and F are moved by the zoom operation, while the focusing lens group F is also moved by the focusing operation.

When the variable power optical system of the inner focusing system having thus been constituted is approximated with thin walled lenses, the following equation (9) is established:

$$\Delta^2 + g_1(d_1, d_2, d_3, d_4, fz_1, fz_2, f_F)\Delta + g_2(d_1, d_2, d_3, d_4, fz_1, fz_2, f_F) = 0 \quad (9)$$

Then, assuming that the object distance $d_1$ is sufficiently greater than each of the distances $d_2$, $d_3$ and $d_4$, the equations (10) and (11) are established:

$$g_1 = f_{z1} - f_{z2} + d_2 - d_4 - \frac{f_{z2}^2}{d_3 - f_{z2}} \tag{10}$$

$$g_2 = (f_F + f_{z1} - d_4)\left(d_2 - \frac{f_{z2}}{d_3 - f_{z2}} - f_{z2} - f_F\right) + (f_F)^2 \tag{11}$$

Then, the equation (9) is partially differentiated with the distance $d_3$ into the equation (12):

$$2\Delta \frac{\partial \Delta}{\partial d_3} + g_1 \frac{\partial \Delta}{\partial d_3} + \Delta \frac{\partial g_1}{\partial d_3} + \frac{\partial g_2}{\partial d_3} = 0 \tag{12}$$

Further, the equation (12) is arranged with respect to $\partial \Delta / \partial d_3$ into the equation (13).

$$\frac{\partial \Delta}{\partial d_3} = -\frac{\Delta \frac{\partial g_1}{\partial d_3} + \frac{\partial g_2}{\partial d_3}}{2\Delta + g_1} \tag{13}$$

When the equations (10) and (11) are substituted for the right side of the equation (13) and arranged, the following equation (14) can be obtained:

$$\frac{\partial \Delta}{\partial d_3}\bigg|_{d_1 = \infty} = -\left(\frac{f_{z1} \cdot \beta_F}{f}\right)^2 \times \frac{\Delta + f_F + f_{z1} - d_4}{\Delta + f_F + f_{z1} - d_4 + \beta_F \cdot f_F} \tag{14}$$

In the equation (14), $\beta_F$ represents the lateral magnifying power of the focusing lens group F, while f represents the entire system focal length of the optical system shown in FIG. 8. Then, it is expressed by a new function $g_3$ for facilitating the comparison with the equation (5) that has been explained for the front focusing system described above as in the following equation (15) or (16).

$$g_3 = (f_{z1} \cdot \beta_F)^2 \times \frac{\Delta + f_F + f_{z1} - d_4}{\Delta + f_F + f_{z1} - d_4 + \beta_F \cdot f_F} \tag{15}$$

$$\frac{\partial \Delta}{\partial d_3}\bigg|_{d_1 = \infty} = -\frac{g_3}{f^2} \tag{16}$$

Also in the case of the inner focusing system, the function $g_3$ shown by the equation (15) and (16) may sometimes become constant by the zoom operation in the same manner as explained for the front focusing system. Although it is actually impossible to design such that the function $g_3$ is a complete constant, it can be realized approximately by properly setting each of the parameters in the right side of the equation (15).

According to the inner focusing system although it is possible to reduce the outer diameter of the optical system to some extent, the drawback present in the front focusing system is still left undissolved in that the moving amount of the focusing lens group F on the wide angle side is unnecessarily large under the condition of realizing the equal amount of movement.

(iii) Rear Focusing System

The rear focusing system has also been used preferably in recent years. The reason is that since the focusing lens group F is disposed to a position nearer to the camera main body as described for the paragraph (ii) above, the driving mechanism can further be simplified and, accordingly, the time required for reaching the focused state can further be shortened as compared with the inner focusing system. However, there is a problem that the lens constitution is complicated as described above. Since the rear focusing system can be analyzed in the same manner as the inner focusing system shown in FIG. 8 excepting that the rear zoom lens group $Z_2$ is saved, explanation therefor is omitted.

As has been described above, although the operationability for the zoom lens can be improved by the combination with the automatic focusing function as compared with the case it is used alone, there is still left a difficulty for attaining the compact structure and the reduced cost because it can not be free from the condition of the equal amount movement involved in the zoom lens.

Explanation will be made more specifically to the first embodiment according to the present invention.

Figure 1:
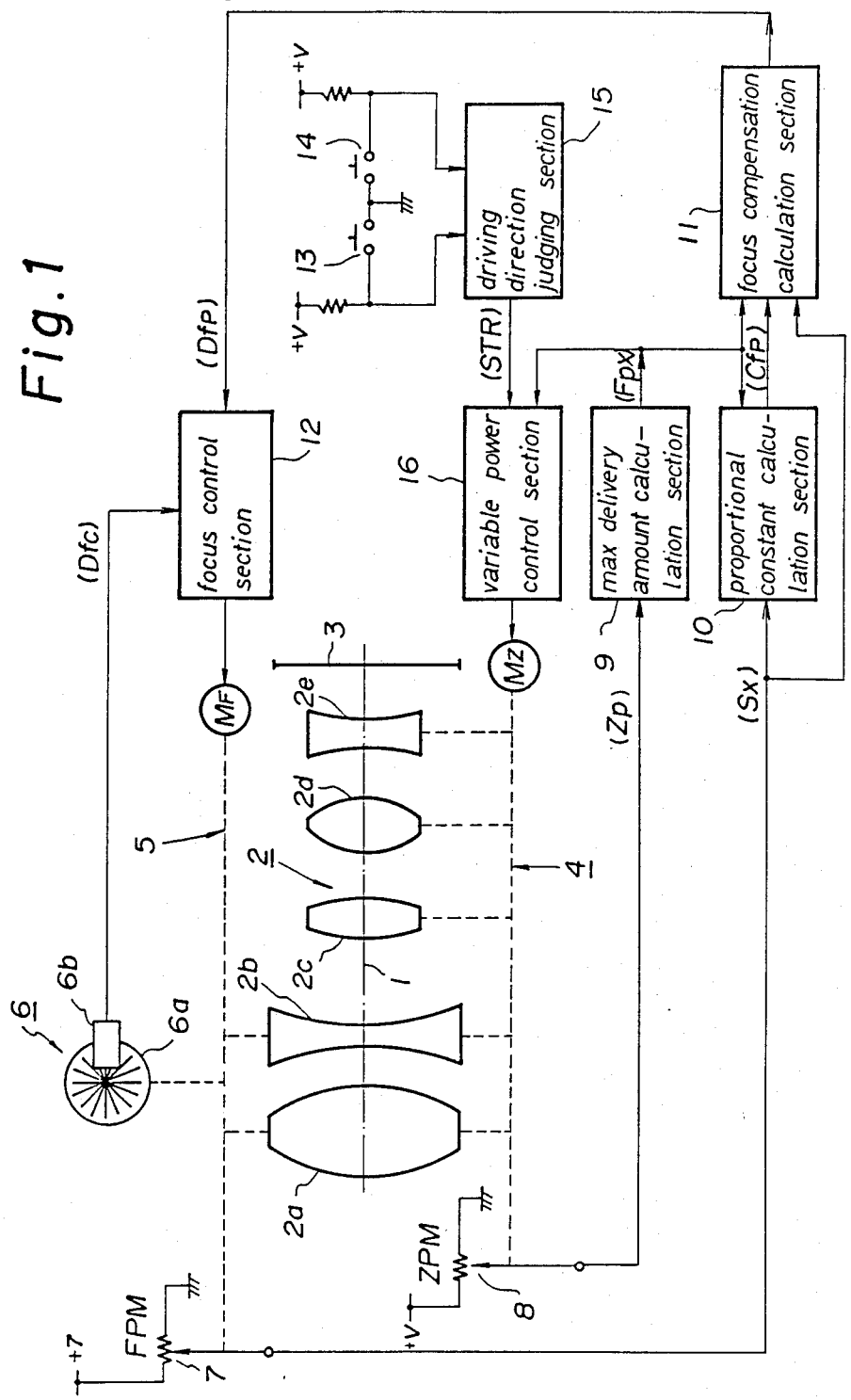
FIG. 1 is a block diagram illustrating the entire constitution for the first embodiment of the variable focal lens device according to the present invention.

FIG. 1 is a block diagram illustrating the overall constitution.

In FIG. 1, are shown optical axis 1 of the optical system, lens group 2 disposed on the optical axis 1 movably therealong for constituting the optical system, in which 2a, 2b, 2c, 2d and 2e are, respectively, first lens, second lens, third lens, fourth lens and fifth lens each composed of a single or a compound lens. The first lens 2a and the second lens 2b constitute the focusing lens group F as described before for the explanation of the theory and the focal length formed with the first lens 2a and the second lens 2b is $f_F$. The third lens 2c—the fifth lens 2e constitute the variable power lens group Z as described in the explanation for the theory and the focal length thereof is $f_z$. Further, as a matter of fact, the entire focal length of the lens group 2 is f. There are also shown film plane 3, a variable power drive section 4 comprising a variable power motor Mz and not-illustrated mechanical section as a variable power driving means for driving the lens group 2 in order to set the entire system focal length f to an optional focal length between the focal length on the telephoto side as the longest focal length (hereinafter simply referred to as "telephoto side") and the focal length on the wide angle side as the shortest focal length (hereinafter simply referred as "wide side"), focus drive section 5 comprising a focus motor $M_F$ and a not illustrated mechanical section as focus adjusting driving means for driving the first lens 2a and the second lens 2b between the infinite position ($\infty$ position) to the nearest position on the optical axis 1 corresponding to the object distance from the infinity to the nearest (specifically, moving along the optical axis while maintaining the distance between the first lens 2a and the second lens 2b constant). There are also shown portions 6 and 7 driven together with the first lens 2a and the second lens 2b respectively by the focus drive section 5, in which the portion 6 is a focus counter as a moving amount monitor means having a slit disc 6a rotationally driven to generate pulses in proportion with the number of rotation thereof from a photo-interrupter 6b for detecting the moving amount of the first lens 2a and the second lens 2b along the optical axis 1, while the portion 7 is a detector for the position of the focusing lens group as detection means for the position of the focusing lens group that generates a voltage in proportion with the position of the first lens $2a$ and the second lens $2b$ on the optical axis as the focus position information Sx described in the explanation for the theory (hereinafter simply referred to as "FPM"); focal length detector 8 that generates a voltage in proportion with the entire system focal length f when driven together with the lens group 2 by the variable power drive section 4 as the focal length information Zp described in the explanation for the theory (hereinafter simply referred to as "ZPM"); maximum delivery amount calculation section 9 as the maximum delivery amount calculation means that receives the focal length information Zp and applies A/D conversion thereto as described above and then calculates the moving amount (that is, delivery amount) Fpx of the first lens group $2a$ and the second lens $2b$ from the ∞ position to the nearest position at Zp; proportional constant calculation section 10 that receives the output Fpx from the maximum delivery amount calculation section 9 and the output Sx as the focus position information from the FPM 7 applies A/D conversion to the output Sx, then calculates the ratio between them and outputs the proportional constant Cfp; focus compensation calculation section as a focus compensation calculation means that receives the three outputs Fpx, Cfp and Sx and calculates the compensation amount Dfp; focus control section 12 as focus control means that receives the output Dfc from the focus counter 6 and the output Dfp corresponding to the compensation amount of the focus compensation calculation section 11 and controls the focus drive section 5; actuation means 13–15 in which each of 13 and 14 constitutes a variable power switch comprising a push button switch capable of external operation for starting the variable power operation, 13 being a variable power-up switch (hereinafter simply referred to as "up switch"), 14 being a variable power down switch (hereinafter simply referred to as "down switch"); driving direction judging section 15 that receives the output from the switches 13 and 14, determines the rotational direction of the variable power motor Mz and then outputs a start signal (STR); and variable power control section 16 as the variable power control means that receives the start signal STR and the output Fpx to control the variable power drive section 4. Further, only the main signal is shown for the input/output in each of the sections.

Figure 2:
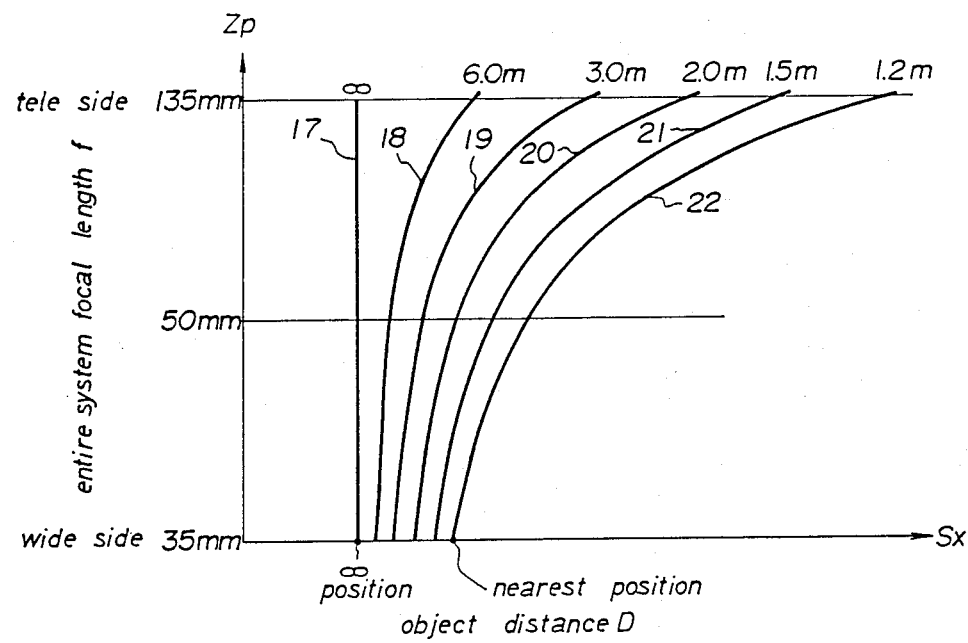
FIG. 2 is a graph showing the characteristics of the device according to the present invention shown in FIG. 1 in which a relationship between the entire system focal length f to be set and the delivery amount Sx for the focusing lens group corresponding to the object distance D is shown on every object distance.

FIG. 2 is a graph showing the characteristics of the device according to the present invention shown in FIG. 1. In the graph, the entire system focal length f to be set and the delivery amount (moving amount) of the focusing lens group (first lens $2a$ and the second lens $2b$) corresponding to the object distance D are shown on every typical object distance D, in which the change of the entire system focal length f is taken on the ordinate and the delivery amount of the focusing lens group is taken on the abscissa while setting the focus position to the infinity as the reference. In this case, the telephoto position as at: f=135 mm, while the wide angle position is for f=35 mm. In FIG. 2, 17–22 represent the focusing curves which are obtained by the equation (17) when the optical system is so constructed that the focal length fF of the focusing lens group is proportional to the square of that of the entire system focal length f. These curves show the changes of the delivery amount of the focusing lens groups $2a$, $2b$ from the infinite position to the focused position relative to the change in the focal length information Zp when the object distance D are set as: ∞, 6.0 m, 3.0 m, 2.0 m, 1.5 m and 1.2 m respectively.

Accordingly, the focusing curve 22 is a focusing curve for the nearest distance corresponding to the maximum delivery amount and the focusing curve 22 for the nearest distance is particularly referred to as Fpx. That is, assuming the nearest object distance D as $D_0$ and Sx=Fpx, Fpx can be obtained by the following equation:

$$Fpx = \frac{D_0 - C_2}{C_0 \cdot Zp + C_1} \quad (27)$$

By separating the constant the following equation can be obtained:

$$Fpx = \frac{C_{22}(D_0)}{Zp + C_{11}} + C_{33}(D_0) \quad (28)$$

Further, setting $C_{11}=C_1$, $C_{22}(D_0)=C_2$ and $C_{33}(D_0)=C_3$ in the equation (28), the following equation, that is, $$Fpx = \frac{C_2}{Zp + C_1} + C_3 \quad (28A)$$

can be obtained.

Figure 3:
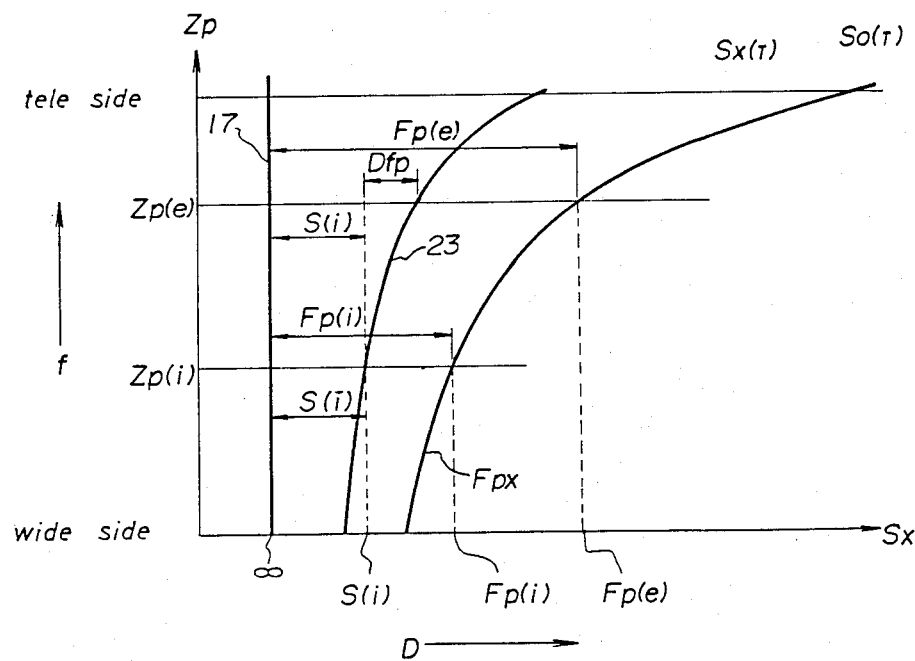
FIG. 3 is a graph for illustrating the principle of the calculation in the focusing compensation calculation section as the main portion of the present invention.

FIG. 3 is a graph in which a portion of the FIG. 2 is omitted for explanating the operation of FIG. 1, particularly, the operation for each of the calculation sections.

In FIG. 3, Zp(i), S(i) and Fp(i) are, respectively, the focal length information (first focal length information) Zp, the focus position information Sx and the moving amount from the ∞ focusing curve 17 to the nearest focusing curve 22 (maximum delivery amount) at Zp(i) just before the variable power operation, while Zp(e), Fp(e) and Dfp are, respectively, focal length information after the elapse of a predetermined time from the start of the operation of the variable power drive section 4 (second focal length information), as well as the compensation amount for compensating the moving amount from the focusing curve 17 to the focusing curve 22 and the shift of the focus at Zp(e). That is, assuming that the proportional constant Cfp just before the variable power operation is expressed by the equation (29), the nearest focusing curve is expressed by the equation (30).

$$Cfp = \frac{S(i)}{Fp(i)} \quad (29)$$

$$Fp(i) = \frac{D_0 - C_2}{C_0 \cdot Zp(i) + C_1} \quad (30)$$

$$Cfp' = \frac{S(i) + Dfp}{Fp(e)} \quad (31)$$

$$Fp(e) = \frac{D_0 - C_2}{C_0 \cdot Zp(e) + C_1} \quad (32)$$

$$Dfp = Cfp \left( \frac{D_0 - C_2}{C_0 \cdot Zp(e) + C_1} \right) - S(i) \quad (33)$$

In the equation (31) described above, Cfp' is a proportional constant after the elapse of a predetermined time.

If Cfp=Cfp' is established, shift of focus does not occur. For attaining this, the equation (31) has to be established. The focusing curve 22 is expressed by the equation (32). Accordingly, if the equation (31) is arranged by changing its left side with Cfp and substituting the equation (32) for the denominator in the right side, the equation (33) can be obtained. Sx(T) is the focus position information Sx when the focal length information Zp is at the position on the telephoto side, while So(T) is the focus position information Sx when Sx(T) is on the nearest focusing curve 22 (that is, at the intersection between Sx(T) and Fpx. 23 represents a focusing curve at an optional object distance plotted as described above.

Figure 4:
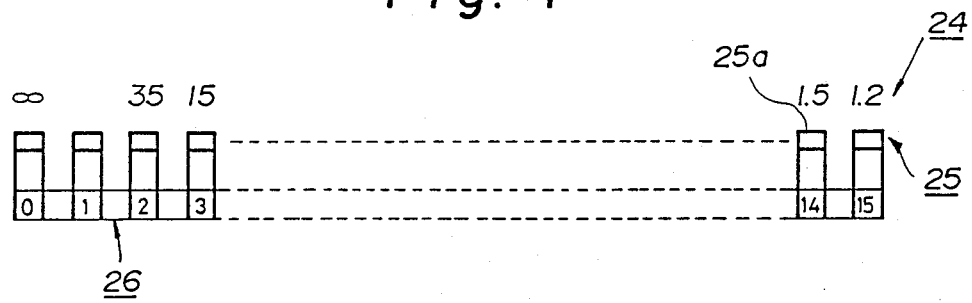
FIG. 4 is a chart schematically illustrating the constitution of an object distance indicator.

FIG. 4 is a view schematically illustrating the constitution of an indicator for indicating the object distance in which numeral 24 shows, for example, a numeral or reference engraved or printed to the outer circumference of a lens barrel (not illustrated) for indicating the distance of an object, reference 25 represents display dots, for example, liquid crystals that serve as an index when lighted up and 26 denotes a dot address making 1:1 correspondence to each of the display dots 25.

Assuming the display accuracy when the focal length information Zp is subjected to A/D conversion as 8 bits, 255 is allocated to the telephoto position while 0 is allocated to the wide angle position. Assuming that the focus position information Sx is also composed of 8 bits, 0 is allocated is the ∞ infinite position and 255 is corresponded to the nearest position respectively. The display dots 25 are composed of 16 dots. Accordingly, $$S_0(T) = \frac{D_0 - C_2}{C_0 \times 255 + C_1} \quad (34)$$

$$Sx(T) = \frac{D - C_2}{C_0 \times 255 + C_1} \quad (35)$$

$$Sx = \frac{D - C_2}{C_0 \cdot Zp + C_1} \quad (36)$$

The equations (34), (35) and (36) can be obtained from the equation (27). The equation (37) can be obtained by substituting a modified equation (34) for the denominator on the right side of the equation (35), substituting a modified equation (36) for the numerator on the right side of the equation (35) and further arranging the equation by using the equation (27).

$$Sx(T) = \frac{Sx \cdot S_0(T)}{Fpx} \quad (37)$$

$$Sx(T) = \frac{255 \times Sx}{Fpx} \quad (38)$$

In the same manner as described above for FIG. 3, the above equations mean that if the ratio between Sx and Fpx at an optical Zp is equal to the ratio between standardized Sx(T) and S0(T) on the telephoto position, Sx(T) corresponds to the true (actual) object distance and, since 255 is allocated to S0(T) as described above, the equation (38) can be obtained by substituting S0(T)=255 for the equation (37). While on the other hand, since the display function DS1(T) displaying the dot address 26 comprises 16 display dots, the following equation (39) can be obtained, into which the equation (38) is substituted to obtain an equation (40).

$$DS1(T) = \frac{Sx(T)}{16} \quad (39)$$

$$DS1(T) = \frac{16 \times Sx}{Fpx} \quad (40)$$

Figure 5:
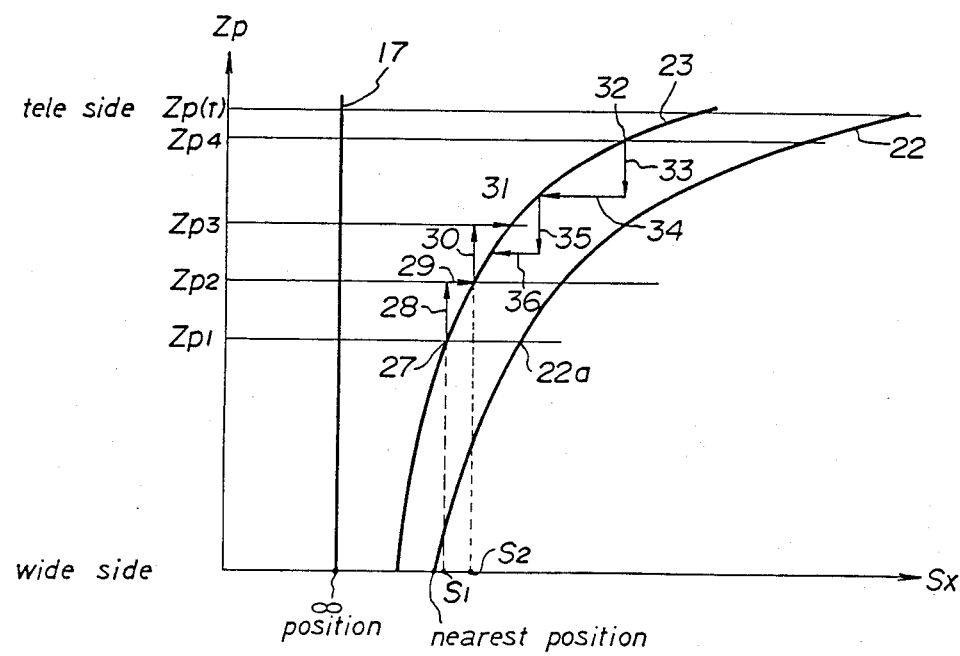
FIG. 5 is a graph for illustrating the operation of the embodiment shown in FIG. 1.

FIG. 5 is a graph for explanating the operation of the embodiment shown in FIG. 1, in which portions identical with those in FIGS. 2 and 3 carry the same reference numerals. In FIG. 5, there are shown a point 27 corresponding to the focal length information Zp1 on an optional curve 23, arrows 28, 30, 33, 35, illustrated the amount of change and the direction of the focal length information Zp, arrows 29, 31, 34 and 36 showing the moving amount and the direction of the focus position information Sx, a point 32 on the focusing curve 23 at Zp4, focal length information Zp(T) at the telephoto position and focal length information values Zp1, Zp2 and Zp3 at certain intermediate focal length.

FIG. 6 is a flow chart illustrating the operation sequence in FIG. 1. The explanation for the constitution is omitted since it is explained in detail in the explanation for the operation described later.

The operation of the present embodiment having thus been constituted will be explained mainly for the flow chart shown in FIG. 6.

Referring at first to the magnifying power up operation from the wide angle side to the telephoto side, when the up switch 13 in FIG. 1 is depressed, a start signal (STR) containing the information for the direction of variable magnifying power is outputted from the driving direction judging section 15 and the flow chart shown in FIG. 6 is started from START.

In the step 6-1 "read variable power direction", the variable power control section 16 temporarily stores that the direction is in the power up direction. Then, in the step 6-2 "read Zp" and the step 6-3 "read Sx", the maximum delivery amount calculation section 9 receives the output from ZPM 8 (Zp) and applies A/D conversion thereto, while the proportional calculation section 10 receives the output (Sx) from the FPM 7 and applies A/D conversion thereto and it is assumed that they are, for example, Zp1 and S1 respectively as shown in FIG. 5. That is, it is assumed that the lens group 2 is situated at the point 27. In the next step 6-4 "proportional calculation for display", the maximum delivery amount calculation section 9 calculates Fpx (the length from the infinite position 17 to the point 22a in FIG. 5) according to the equation (28A), while the proportional constant calculation section 10 also receives Fpx and calculates the proportional constant Sx(T) according to the equation (38). Then, in the step 6-5 "drive variable power lens", the variable power control section 16 causes the variable power motor Mz to rotate in the power-up direction. Then, the lens group 2 moves and the output (Zp) from ZPM 8 also changes as shown by the arrow 28. However, since the focus motor $M_F$ does not operate for FPM 7 FRM7, the distance between the first lens group 2a and the second lens group 2b changes in accordance with a predetermined cam operation but they are kept at a constant position as the focusing lens group and not changed by the variable power operation.

Then in the step 6-6 "indication for focal length", the present value Zp1 of the focal length information Zp is indicated on a focal length indicator not illustrated and it is further calculated in accordance with the equation

(40) as to which of the liquid crystal display dots 25 in FIG. 4 is lighted up. If the result of the calculation is: DS1=14, the liquid crystal dot 25a is lighted up in accordance with the display address 26 and the indication for the object distance is also displayed. In the next step 6-7 "registration of present position", the focal length information Zp just before the rotation of the variable power motor Mz is registered by setting the afore-mentioned Zp1 as: Zp=Zp1. Then, in the next step 6-8 "read Zp", the newest value Zp1 for the focal length information Zp now begins to change for the direction shown by the arrow 28 in FIG. 5 is read and it is checked at the conditional branch in the step 6-9 "more than 8 step movement ?" as to if the movement is conducted for more than a predetermined amount. Then, if it does not yet reach 8 step, the flow is branched into NO. Then, in the next conditional branch step 6-13 "variable power lens at an end?" (since the telephoto side is the variable power and in this case), the flow is branched to NO since the movement does not yet reach the telephoto side. In the step 6-14 "variable power switch ON?", it is checked as to if the variable power switch 13 or 14 is depressed or not and the flow is branched to YES (since the up-switch 13 is still depressed) and then returns again to the step 6-7 "registration for present position" and the foregoing operations are repeated after replacing Zp1' as Zp0=Zp1'.

Then when the movement reaches Zp2 in FIG. 5 and reaches the 8 step, the flow is branched at the step 6-9 "more than 8 step movement?" into YES and the present focus position information Sx, that is, Sx=S(i)=Si is read at the step 6-10 "read Sx" since the focus drive section 5 is not actuated in this case.

In the next step 6-11 "calculation for compensation" as a main portion of the present invention, the focusing compensation calculation section 11 calculates the compensation amount Dfp according to the equations (28A), (29) and (33) and the focus control section 12 rotates the focus motor $M_F$ in the next step 6-12 "drive focusing lens". Accordingly, the output (Sx) of the FPM 7 changes in the direction shown by the arrow 29 in FIG. 5.

For the simplification of the explanation, although it is drawn in FIG. 5 that as if the variable power motor Mz is stopped during rotation of the focus motor $M_F$. However, the variable motor Mz continues to rotate also during compensating operation by the focus motor $M_F$ as can be seen from the flow chart of FIG. 6. Further, the focus control section 12 successively compares the output Dfc from the focus counter 6 with the compensation amount Dfp and stops the focusing motor $M_F$ at Dfc=Dfp, that is, at the position where the arrow 29 in FIG. 5 reaches the focusing curve 23 to thereby complete one cycle of the power up operation. Further, if the variable power end is not reached and the variable power switch 13 is kept to be depressed, the flow returns to the step 6-7 "registration for present position" with Zp2, S2 in FIG. 5 being as the present position to conduct the operation for the second cycle, that is, the operation for the arrows 30, 31. Then, when the up-switch 13 turns OFF, the flow branches at the step 6-14 "variable power switch ON?" into NO and the variable power control section 16 stops the variable power motor Mz to interrupt the operation of the variable power drive section 16 in the step 6-15 "stop variable power motor". Then, in the next step 6-16 "update for focal length indication", indication for the new entire system focal length f is updated by reading the focal length information Zp (Zp3 in this case) as described above and, further, the object distance indication is also updated by the focus position information Sx. So long as Sx situates on the focusing curve 23, the display dot 25a is kept lighted at Zp (T), as well as at any position of Zp1-Zp4. This is the power up operation. Since the power down operation shifting from the telephoto side to the wide angle side can be considered substantially the same as the power up operation described above, it will be explained only simply.

Assuming that the lens group 2 is situated, for example, on the point 32 in FIG. 5 when the down switch 14 is depressed, the system is started from the point 32, by which the variable power driving section 4 is driven in the direction of the arrow 33 and when it reaches the predetermined 8 steps, the focus drive section 5 is driven in the direction shown by the arrow 34. Then, the next second cycle shown by the arrows 35, 36 is executed after the above-mentioned first cycle operation. Then, the power-down operation is completed when the down switch 14 turns OFF.

Explanation will be made to the second embodiment of the present invention.

Speaking generally, when a focusing lens is moved to the focus point on an optical axis in an automatic focusing device, if the difference between the position of focusing lens and the focus point is extremely great, distance measurement may some time be impossible due to remarkable image blurring, and as a result, the automatic focusing device can not operate normally. The second embodiment of the present invention has a function of rapidly getting out of the focus-impossible state due to the incapability of the distance measurement and transferring to the focus-possible state.

Figure 9:
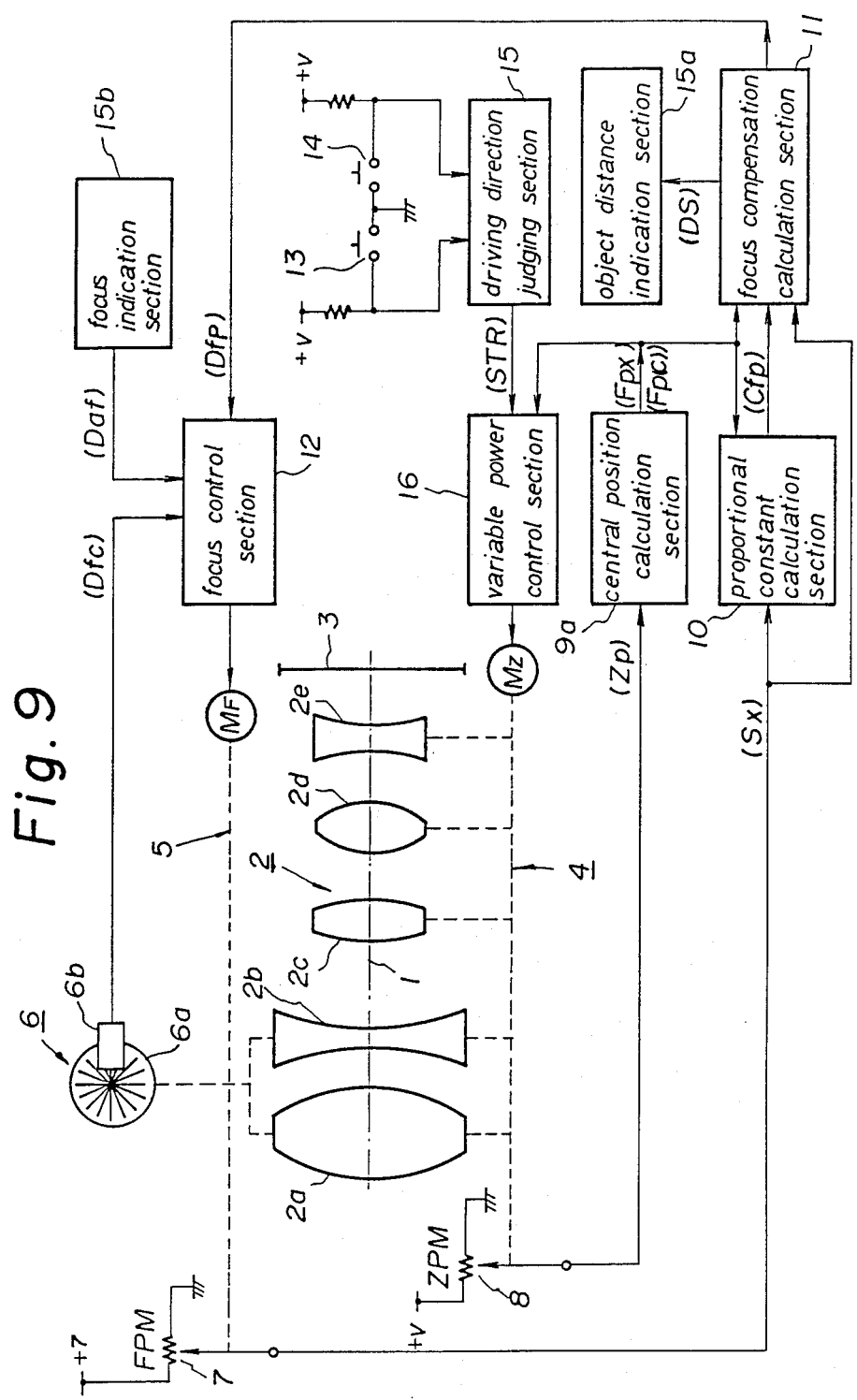
FIG. 9 is a block diagram illustrating the entire constitution of the second embodiment of the variable focal lens device according to the present invention.

FIG. 9 is a block diagram illustrating the entire constitution of the second embodiment.

In the drawings, the components identical with those in the first embodiment carry the same reference numerals and detailed explanations therefor are omitted.

In this embodiment, a central position calculation section 9a as the central position calculation means is used instead of the maximum delivery calculation section 9 used in the first embodiment and there are also additionally provided an object distance indication section 15a and a focus indication section 15b.

The central position calculation section 9a comprises a maximum delivery amount calculation section that receives the focal length information Zp outputted from the focal length detector 8, applies A/D conversion thereto then calculates the moving amount (maximum delivery amount) Fpx of the first lens 2a and the second lens 2b from ∞ position to the nearest position at Zp and outputs the calculated value and a calculation section for calculating and outputting the central position Fp(c) by the calculation equation: (Fp(c)=Fpx/2) described later.

The object distance indication section 15a receives the output (DS) from the focusing compensation calculation section 11 and indicates the object distance on the object distance indicator described later. The focus indication section 15b comprises an AF (automatic focusing) section for measuring the object distance and a focus switch or release switch capable of external operation that starts the distance measuring operation. The indication section 15a outputs the moving direction (MDR=1, MDR=−1) and the moving amount (compensation amount Daf) of the focusing lens group 2a, 2b to the focus control section 12.

Figure 10:
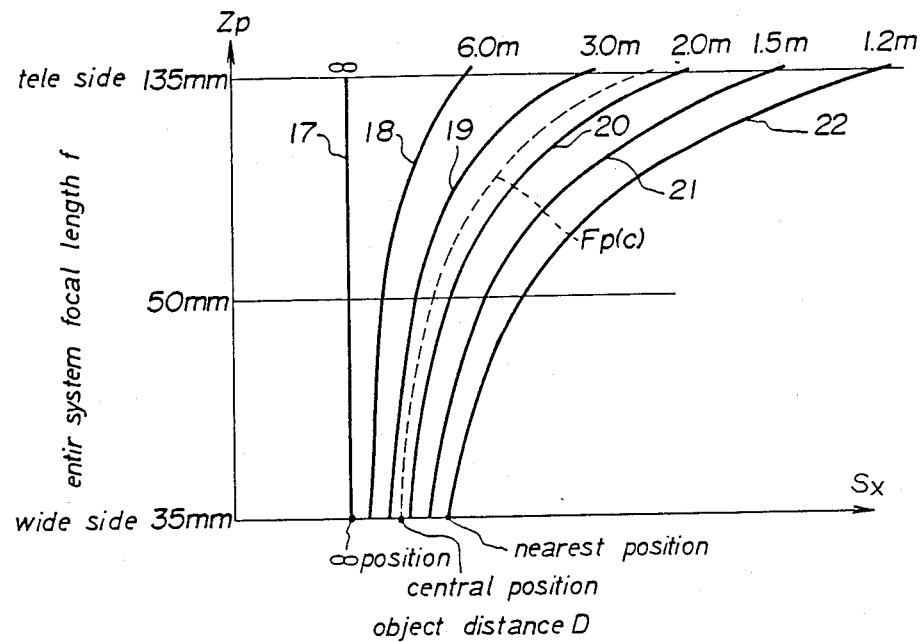
FIG. 10 is a graph showing the characteristics of the device according to the present invention shown in FIG. 9 in which a relationship between the entire system focal length f to be set and the delivery amount Sx for the focusing lens group corresponding to the object distance D is shown on every object distance.

FIG. 10 is a graph similar to that of FIG. 2 for the characteristics of the present embodiment.

Since the central position Fp(c) shown by the broken line in the FIGURE is an intermediate value for the maximum delivery Fpx determined by the equation (28A), it can be obtained by the following equation:

$$Fp(C) = \frac{F2x}{2} \quad (41)$$

Figure 11:
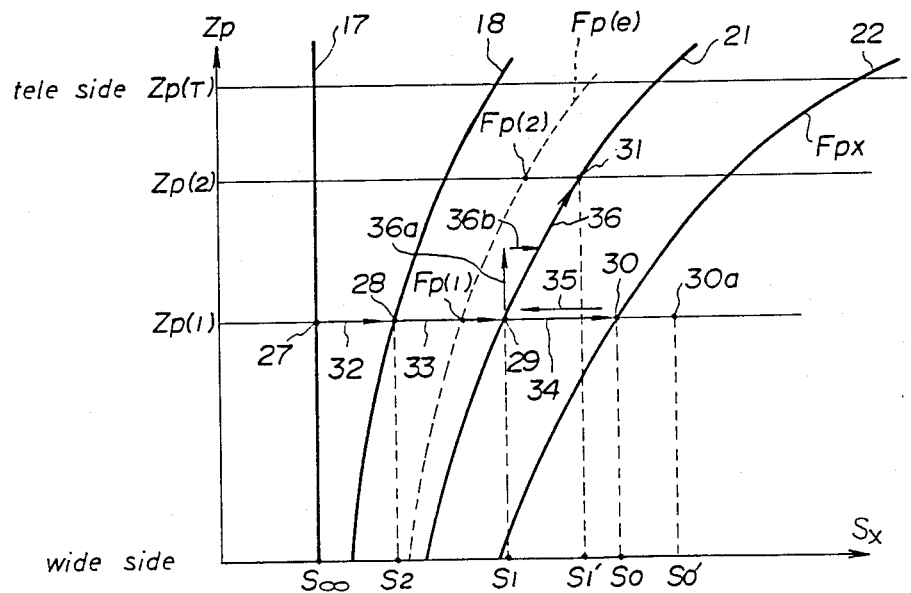
FIG. 11 is a graph illustrating the operation of the embodiment shown in FIG. 9.

FIG. 11 is a graph for explanating the operation of the embodiment shown in FIG. 9. In FIG. 11, reference numerals 27–30 and Fp(1) are intersections of the respective focusing curves 17–22 at Zp=Zp1 and the central position Fp(c) and the intersections 27–30 corresponds to the output $S\infty = 0$, S2, S1, S0 from FPM 7. 30a is a point at Zp(1) in a range Sx>Fpx and 31 and Fp(2) are, respectively, intersections with the focusing curve 21 and Fp(c) at Zp=Zp(2), and the intersection 31 corresponds to the output S1' from FPM 7. Zp(T) is a value for Zp on the telephoto side as described above and Zp(T)=255. Reference numerals 32–35 are, respectively, arrows indicating the direction of the focusing drive, while 36 is an arrow indicating the direction of the variable power drive.

The operation of the present embodiment having thus been constituted will be explained.

At first, the automatic focusing operation will be explained along with the flow chart shown in FIG. 12. If the distance measurement is possible in a state when a the focus switch or release switch (not illustrated) in the focus indication section 15b shown in FIG. 9 turns ON, the flow is branched at step 12-1 "distance measurement possible?" into YES. Then, the AF (automatic focusing) section in the focus indication section 15b measures the distance till the object to calculate the compensation amount Daf and, further, determines the driving direction MDR of the focusing lens group 2a, 2b and informs the completion of the AF calculation to the focus control section 12. It is assumed here that the object distance is 1.5 m as the result of this distance measurement, and the present position for the focusing lens group 2a, 2b is at the intersection 27 shown in FIG. 11. As can be seen from FIG. 11, the focus control section 12 reads the data corresponding to the difference between $S_1$ and $S\infty = 0$ as the compensation amount Daf and MDR=1 as the driving direction from the focus indication section 15b in the step 12-2 "read compensation amount" and the next step 12-3 "read drive direction". Then, in the next step 12-4 "to nearest side?", the driving direction is checked and the flow is branched into YES since MDR=1. In the step 12-5 "read Zp", the maximum delivery calculation section in the central position calculation section 9 reads Zp=Zp(1) and calculates the maximum delivery amount Fpx in the step 12-6 "calculation of maximum delivery amount" according to the equation (27) or (28A). According to FIG. 11, Fpx=S0 in this case. In the next step 12-7 "clear Dfc", the output Dfc from the focus counter used in the former operation is cleared to 0. Then, in the step 12-8 "read Sx", the focusing compensation calculation section 11 reads Sx=S∞=0 to inform that the focusing lens group 2a and 2b is now at the ∞ position. Then, in the step 12-9 "lens group at an end?", Sx<Fpx or for Sx=0 is checked within a movable range of 0<Sx<Fp under the condition of the driving direction MDR. That is, since Sx=0 in this case, it is out of the movable range and, since the driving direction is MDR=1 that shows the driving toward the nearest position, the flow is branched into NO. In the next step 12-10 "drive lens group", the focus control section 12 controls the focus motor $M_F$so as to drive the focusing lens group 2a, 2b by one step in the direction of MDR=1. In the next step 12-11 "read Dfc", the output from the focus counter 6 is read and it is checked in the step 12-12 "end of driving?" as to if Dfc=Daf or not. In this case, the flow is branched into NO and again returns to the step 12-8 "read Sx".

In FIG. 11, this means the movement from the intersection 27 in the direction of the arrow 32 only by one step. The foregoing operations after the step 12-8 "read Sx" are repeated till Dfx=Daf (the repeating loop is hereinafter referred to as "lens drive loop"). Accordingly, in FIG. 11, the lens group moves starting from the intersection 27 along the arrows 32, 33 successively till the intersection 29 as the terminal point by way of the intersection 28. That is Dfc=Daf. Although it can not be specified as to which of the operations in the lens drive loop is executed, the flow reaches to the step 12-12 "end of driving?" after an extremely short period of time (several tens of microseconds) and the flow is branched into YES to complete the focusing operation.

Then, in the step 12-13 "indicate object distance", the maximum delivery amount calculation section in the central position calculation section 9 reads Zp=Zp(1), if the position is, for example, at the intersection 29 in FIG. 11, substitute Zp(1) into the equation (28A) or (27) to output the maximum delivery amount Fpx. Then, the focusing compensation calculation section 11 reads Sx=S1, receives Fpx, calculates the value for the indication function DS1(T) by the equation (40) and outputs the indication address (dot address) as the indication output (DS). The object distance indication section 15(a) receives the indication output (DS) and checks if the indication function DS1(T) is within a range of the dot address 26 or not. Since it is within the above-mentioned range in this case, the flow reaches END while keeping the indication dot 25a lighted up by DS1(T)=14 and all of the automatic focusing operations have been completed.

Explanation will be made to the operation where the object is moved further from this state and situates at a position nearer to the camera than the nearest object distance 1.2 m, that is, at a place corresponding to the point 30a in FIG. 11. When the focusing operation is started as has been described above, the operation from the start to the lens driving loop in FIG. 12 are the same as described above and the lens group is driven starting from the intersection 29 in the direction of the arrow 34 toward the point 30a as the end point in FIG. 11. However, as is apparent from FIG. 11 since $S_0 < S_0'$, the lens driving loop reaches the intersection 30 before branching into YES at the step 12-12 "end of driving?" and is branched into YES from the step 12-9 "lens group at an end?" to complete the automatic focusing operation. In this case, situation of the object within the nearest distance can be informed to the user, for example, by a predetermined operation such as flickering of the indication dot 25b.

Explanation will then be made for the case where the distance measurement is impossible, that is, where the flow is branched at the step 12-1 "distance measurement possible?" into NO mainly referring to FIG. 13.

In FIG. 11, it is assumed that the present position for the focusing lens group 2a, 2b is at the intersection 28, while the object distance is 1.2 m, that is, the object is present at a position corresponding to the intersection 30. The flow chart starts from ①. Zp=Zp(1) is read in the step 13-1 "read Zp", Fpx is calculated in the step 13-2 "calculate maximum delivery amount" according to the equation (27) or (28A) and the central position Fp(1) at Zp(1) is calculated in the step 13-3 "calculate central position" in accordance with the equation (41), that is, Fp(c)=Fpx/2. In the step 13-4 "on ∞ position side?", it is checked as to which side the focusing lens group 2a, 2b is situated relative to the central position. Since the intersection 28 as the starting point situates on the side of ∞ position as viewed from the central position Fp(1), the flow is branched into YES and the driving direction is determined in the step 13-5 "MDR=1" from the ∞ position to the nearest position. That is, the lens group is forcively moved to the nearest side if the present position is on the ∞ side than the central position Fp(1), whereas to the ∞ side if the present position is on the nearest side.

Then, Sx=S2 is read in the step 13-7 "read Sx", the compensation amount Dfp to the focusing point is calculated by the previously calculated Fpx and the equation (33) in the step 13-8 "calculate compensation amount" and the output Dfc from the focusing counter 6 used in the foregoing operation is cleared in the step 13-9 "clear Dfc". Then, the flow is advanced to the step 13-10 "read Sx" and the succeeding flow is the same as the lens driving loop described for FIG. 12 excepting for the step 13-12 "distance measurement possible?". Accordingly, the operation is also referred to in the same manner. However, the content of the check in the step 13-15 "end of driving?" is different from that in FIG. 12 in that comparison is made between Dfc and Dfp. By the operation of the lens driving loop, the focusing lens group 2a, 2b moves from the intersection 28 toward the direction of the arrow 33, passes the central position Fp(1) and the intersection 29 and further advances in the direction of the arrow 34. Since the AF section in the focus indication section 15b informs that the group enters into the measurement-possible region after passing the intersection 29, the flow is branched from the step 13-12 "distance measurement possible?" in the lens driving loop into YES to complete the operation of the driving mode judgement, transfers from ② in FIG. 12 to the abovementioned automatic focusing operation, reaches the intersection 30 and then complete the entire operation.

Then, explanation will be made to the operation where the focusing lens group 2a, 2b situates on the intersection 29 and the object situates corresponding to the point 30a. Naturally, the AF section regards that the point 30a corresponds to the distance measurement impossible region. In this case, since the operations are only different from those in the foregoing explanation in that the flow advances to the step 13-6 "MDR=−1" in FIG. 13, explanation for the flow chart is omitted. The lens group is driven starting from the intersection 29 toward ∞ side in accordance with the principle of the driving mode judgement as described above, and the driving is completed at the cross point 27.

In this case, the flow does not branch into YES in the step "distance measurement possible?" in FIG. 12 and FIG. 13. In this case, a predetermined symbol is displayed so as to cause the user to conduct distance measurement again.

Then, if the user operates for the distance measurement again, the focusing lens group 2a, 2b moves starting from the intersection 27 toward the arrow 32, further advances in the direction of the arrow 34 passing the intersection 28, 29 and, about at the middle of the progress, the point 30a which is the focusing point for the object enters into the distance measurable region of the AF section. Then, the flow branches from "focus detection OK?" into YES and transfers to the automatic focusing operation shown in FIG. 12. However, since this has been already explained specifically in the automatic focusing operation described above, subsequent operations are not explained.

Explanation will then be made to the third embodiment according to the present invention.

This embodiment has an advantage that the mechanism for the variable focal lens system can be simplified since there is no requirement for moving the second lens group constituting the focusing lens group in accordance with the movement of the variable power lens group.

Figure 14:
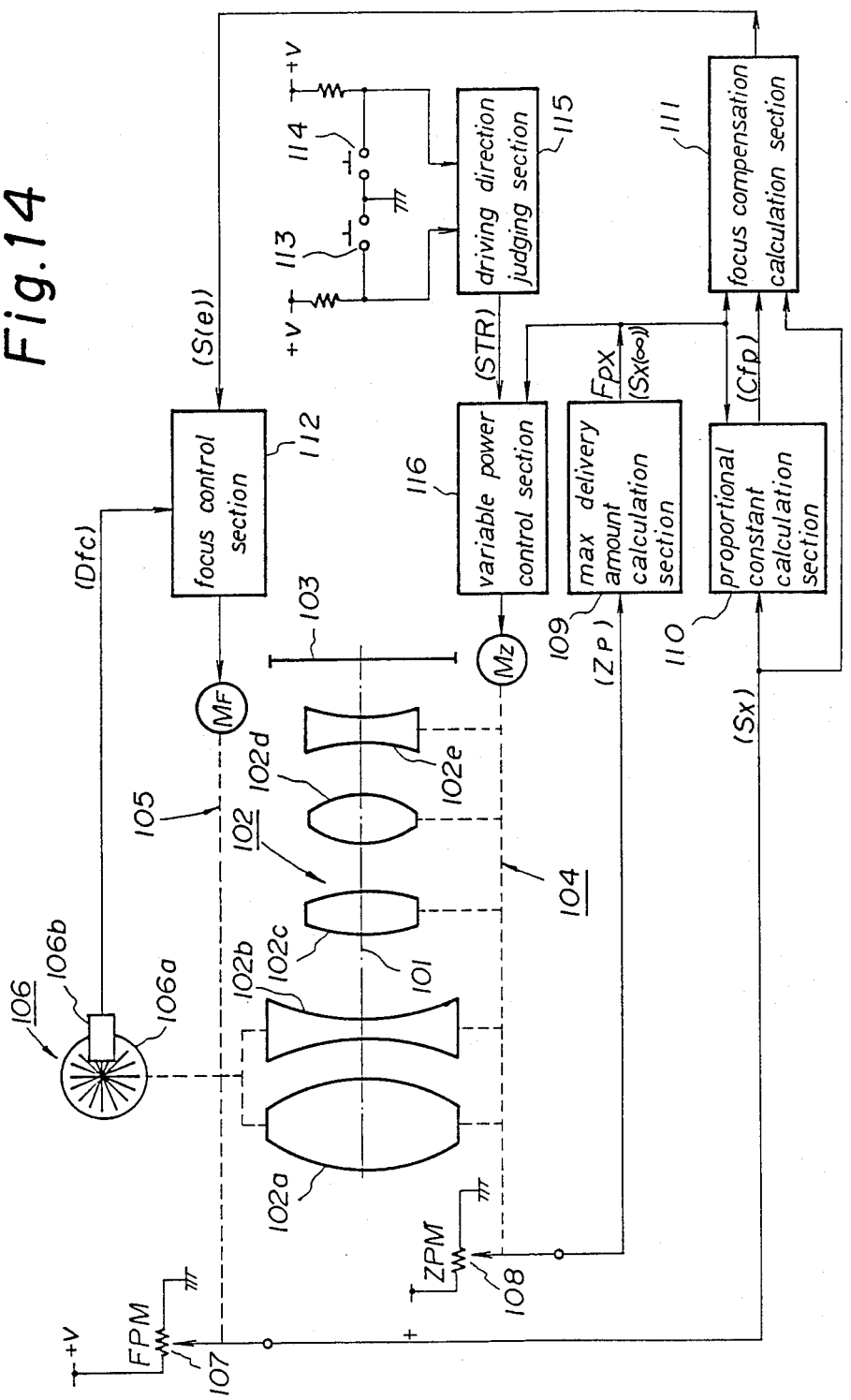
FIG. 14 is a block diagram illustrating the entire constitution of the third embodiment of the variable focal lens device according to the present invention.

FIG. 14 is a block diagram illustrating the entire constitution of the present embodiment. In FIG. 14, are shown optical axis 101 for the optical system, lens group 102 disposed movably on and along the optical axis 101 for constituting the optical system, in which first lens 102a, second lens 102b, third lens 102c, fourth lens 102d and fifth lens 102e are respectively, composed of single or compound lens. The first lens 102a and the second lens 102b constitute a focusing lens group. The third lens 102c—fifth lens 102e constitute a variable power lens group. The entire system focal length of the optical system comprising the lens group 102 is f. Reference numeral 103 indicates a film plane. Numeral 104 denotes a variable power drive section comprising a variable magnification motor Mz and a mechanical section described later as variable power drive means for driving the lens groups excepting for the second lens 102b for setting the entire system focal length f to an optional focal length from the focal length on the telephoto side as the longest focal length (hereinafter simply referred to as "telephoto side") to the focal length on the wide angle side (hereinafter simply referred to as "wide angle side") as the shortest focal length. Reference numeral 105 denotes a focus drive section comprising a focus motor $M_F$ and a mechanical sections described later as a focusing drive means for driving the first lens 102a and the second lens 102b to a focus position from the infinite position (∞ position) to the nearest position on the optical axis 101 corresponding to the object distance from the infinity to the nearest position (specifically, for moving while maintaining the first lens 102a and the second lens 102b with a predetermined gap along the direction of the optical axis). Components 106 and 107 are respectively driven together with the first lens 102a and the second lens 102b by the focus drive section 105 in which the component 106 is a focus counter that generates pulses from a photo interrupter 106b by the number in proportion to the number of rotation when a slit disc 106a is rotationally driven to thereby detect the moving amount of the first lens 102a and the second lens 102b on the optical axis 101, and the component 107 is a focusing lens group position detector (hereinafter referred to as "FPM") as the detection means for the position of the focusing lens group that outputs a voltage in proportion to the position of the first lens 102a and the second lens 102b on the optical axis as the focus position information Sx. There are also shown a variable power lens position detector 108 as a detection means for the position of the variable power lens group that outputs the voltage in proportion with the entire system focal length f as the focal length information Zp when driven together with the lens group by the variable power drive section 104 (hereinafter simply referred to as "ZPM"); a maximum delivery amount calculation section 109 that receives the focal length information Zp, applies A/D conversion thereto and then calculates the moving amount (that is, the delivery amount) Fpx of the first lens 102a and the second lens 102b from the ∞ position to the nearest position at Zp; a proportional constant calculation section 110 that receives the output Fpx from the maximum delivery amount calculation section 109 and the output Sx as the focus position information from the FPM 107, applies A/D conversion to the outputs Sx, calculates the ratio of the output Sx to the output Fpx and then outputs the proportional constant Cfp; a focusing compensation calculation section 111 that calculates the compensation amounts Dfp for focusing upon receiving three kinds of output Fpx, Cfp and Sx; a focus control section 112 that controls the focus drive section 105 upon receiving the output Dfc from the focus counter 106 and the output Dfp corresponding to the compensation amount from the focus compensation calculation section 111; starting means 113-115, in which reference numerals 113 and 114 denote variable power switches each comprising a push button switch capable of external operation for starting the variable power operation, 113 being a power-up switch (hereinafter simply referred to as "up-switch"), 114 being a power-down switch (hereinafter simply referred so as "down-switch") and 115 being a driving direction judging section that receives the outputs from the switches 113-114, determines the direction of the rotation of the variable power motor Mz and then outputs the start signal (STR); and a variable power control section 116 that controls the variable power drive section 104 upon receiving the start signal STR and the output Fpx.

The maximum delivery amount calculation section 109, the proportional constant calculation section 110, the focusing compensation calculation section 111, the focus control section 112 and the variable power control section 116 constitute a variable power focus compensation control means. +V denotes a power source and only the main signals are shown for the input/output in each of the sections.

Explanation will then be made to the content of the calculation executed in each of the calculation sections and calculation formulae relevant thereto.

The focusing system used herein is assumed as the front focusing system. The maximum delivery amount calculation section 109 executes the calculation by the following equation:

$$Fpx = \frac{C_2}{Zp + C_1} + C_3 \quad (42)$$

where Fpx is the output corresponding to the delivery amount from the infinite position to the nearest position, Zp is the output from the ZPM 108 and $C_1$, $C_2$, $C_3$ are constants inherent to the lenses in the variable power optical system respectively.

Further, the maximum delivery amount calculation section 109 calculates the focus position information Sx corresponding to the cam diagram at the ∞ position of the first lens 102a in FIG. 15 as described later as Sx(∞) by the following calculation equation:

$$Sx(\infty) = \frac{A_1}{Zp + A_0} + A_2 \quad (43)$$

where Zp is the output from the ZPM 108 and $A_0$, $A_1$ and $A_2$ are constants inherent to the lenses in the variable power optical system.

The proportional constant calculation section 110 executes the calculation by the following formula:

$$Cfp = \frac{S(i)}{Fp(i)} \quad (44)$$

where S(i) is the output from FPM 7 just before starting the operation of the variable power drive section 104, Cfp is the output from the proportional constant calculation section 110 and Fp(i) is the output from the maximum delivery amount calculation section 109 by the output from the ZPM 108 just before the starting operation of the variable power section 104.

Further, the focusing compensation calculation means 111 executes the calculation for determining a predetermined focusing position S(e) by the following equation:

$$S(e) = Cfp \cdot Fp(e) + S_1 \quad (45)$$

at a predetermined time interval after starting the operation of the variable power drive section 104, or at a time where the change of the output from the ZPM 108 reaches a predetermined amount by setting the output from the focusing compensation calculation section 111 as S(e), the output from the proportional calculation section 110 as Cfp, the output ZPM 108 at the time to be compensated and the value for Sx(∞) as Zp1, $S_1$ respectively. $F_{p1}$ is a value obtained when substituting Zp=Zp1 for the equation (42). The following equation (46) gives a fundamental concept of the present invention and the foregoing equations (42)–(45) are derived from the equation (46):

$$D = (C_0 Zp + C_1) \cdot Sx + C_2 \quad (46)$$

where D represents the object distance and $C_0$, $C_1$ and $C_2$ are constants predetermined upon design.

If adequate means is attained for controlling Zp, Sx so that the object distance D may not change in the equation (46), it is possible to eliminate the shift of focus by the variable power operation (compensation).

Figure 15:
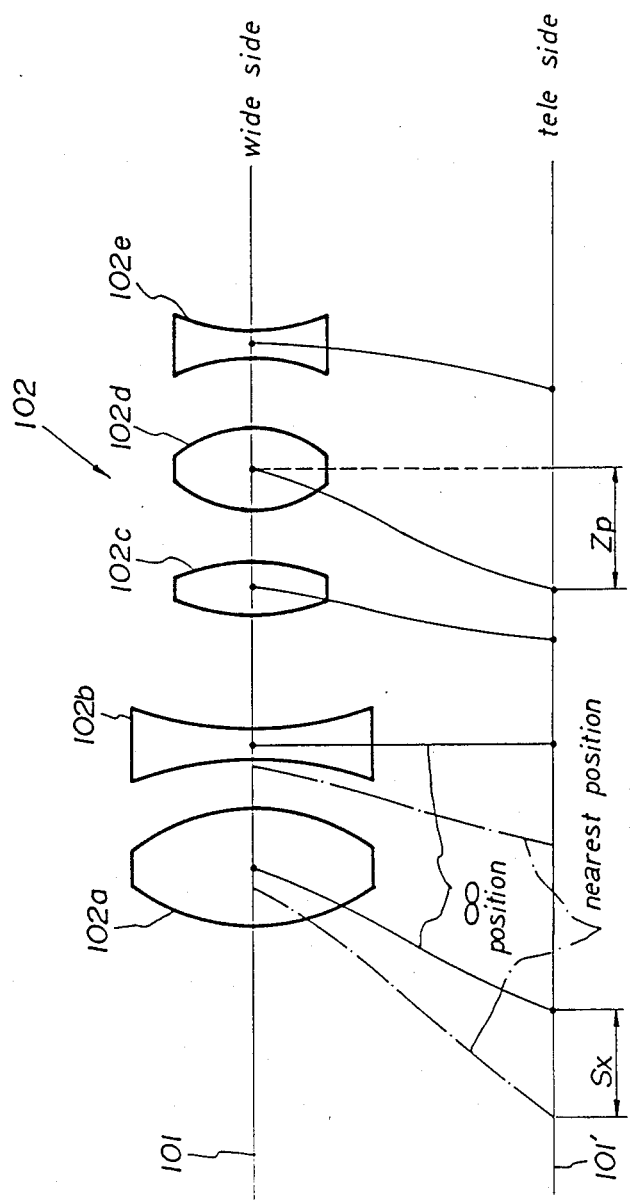
FIG. 15 is a chart illustrating the change of the focal length f to be set and the way of movement for each of the lens groups as the characteristics of the variable focal lens used in the present invention.

FIG. 15 is a cam diagram illustrating the movement of the lens group, which shows such a case where the entire focal length f is renewed, for example, from the wide angle side to the telephoto side. Sx is the focus position information Sx described above, which shows the delivery amount (moving amount) of the focusing lens (the first lens 102a and the second lens 102b) corresponding to the object distance. Zp is the focal length information Zp as described above, and the moving amount of the variable power lens group due to the variable power operation is shown for the fourth lens 102d as the representative in the drawing. In this drawing, 101 denotes an optical axis on the wide angle side, while 101' denotes an optical axis on the telephoto side.

Figure 16:
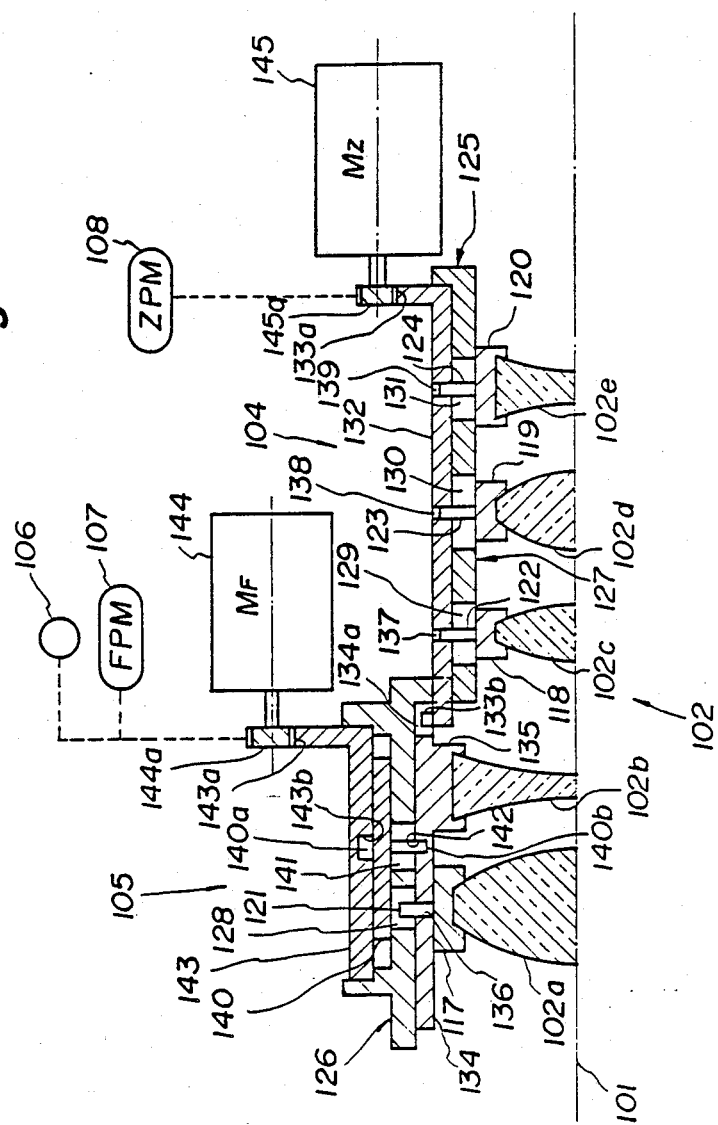
FIG. 16 shows a side elevation of longitudinal cross section illustrating a specific constitution of the variable power drive section and the focus drive section in FIG. 14, which is a principal portion of the present invention.

FIG. 16 is a side elevational view in longitudinal cross section for illustrating the construction of the mechanical sections for the variable power drive section 104 and the focusing drive section 105 not illustrated specifically in FIG. 14. FIGS. 17-21 (except for FIG. 18(b)) are, respectively, enlarged partial plan views for the respective portions in FIG. 16 and FIG. 18(b) is an enlarged cross sectional view taken along line A-A' in FIG. 18(a).

In FIG. 16, there are shown first cell 117 and third to fifth cells 118-120 for respectively securing to support the first lens 102a and the third lens 102c-fifth lens 102e. A first pin 121 and third-fifth pins 122-124 are projected respectively to the first cell 117 and to the third cell 118-fifth cell 120 in the direction substantially in perpendicular to the optical axis 101. A reference 125 is a fixed cell of a cylindrical cross sectional shape as an immobile member, having a front half 126 and a latter half 127 with the smaller diameter than that for the front half 126. Reference numerals 128 and 129-131 denote respectively linear cam grooves of the fixed cell 125 perforated in the fixed cell 125 and each having a width capable of fitting the first pin 121 and the third-fifth pins 122-124, respectively. A variable power cell 132 is rotatably fitted into the outer circumference of the latter half 127 in the state inhibited from the movement to the direction of the optical axis, and a gear portion 133a is formed on the outer circumference of the flanged portion at the rear end of the variable power cell 132. A rotation transmission pin 133b is projected at the front end of the variable power cell 132 substantially perpendicular to the optical axis 101. A variable power transmission cell 134 is fitted rotatably to the inner circumference of the front half 126 of the fixed cell 125 and also movably in the direction of the optical axis. A recess 134a is formed from the rear end of the variable power transmission cell 134 along the optical axis 101 and has the length corresponding at least to the moving amount of the variable power transmission cell 134 in the direction of the optical axis and such a width as capable of fitting the rotation transmission pin 133b therein. There are also shown a fixed portion 135 for fixing the second lens 102b to the variable power transmission cell 134, a cam groove 136 perforated to the variable power transmission cell 134 with a width capable of fitting the first pin 121 therein, cam grooves 137-139 perforated respectively to the variable power cell 132 each with the gap capable of inserting the third pin 122-fifth pin 124, respectively, a focus transmission cell 140 fitted to the outer circumference of the front part 126 of the fixed cell 125 movably only in the direction of the optical axis, focus pins 140a and 140b projected respectively from the outer circumference and the inner circumference of the focus transmission cell 140 in the direction perpendicular to the optical axis 101 respectively, linear cam groove 141 and cam groove 142 perforated respectively to the front half 126 of the fixed cell 125 and to the variable power transmission cell 134 with the width capable of fitting the focus pin 140b therein, a focus cell 143 engaged rotatably to the outer circumference of the focus transmission cell 140 and restricted from the movement in the direction of the optical axis, a gear portion 143a formed on the outer circumference of the flanged portion disposed to the rear end of the focus cell 143, a cam groove 143b formed on the focus cell 143 with such a width as capable of fitting the focus pin 140a, a focus motor $M_F$ 144 as described in FIG. 14, a prime gear 144a driven by the focus motor $M_F$ and meshing with the gear portion 143a of the focus cell 143, a variable power motor Mz 145 and a prime gear 145a driven by the variable power motor Mz while meshing with the gear portion 143a of the variable power cell 132. In the subsequent FIGS. 17-21, portions identical with those shown in FIG. 16 carry the same reference numerals and overlapped explanations therefor will be omitted.

Figure 17:
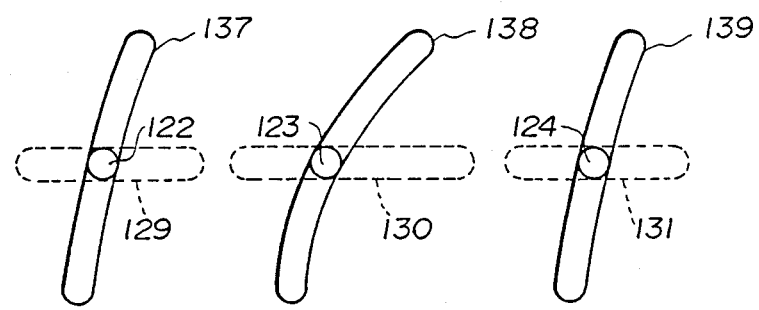
Figure 18:
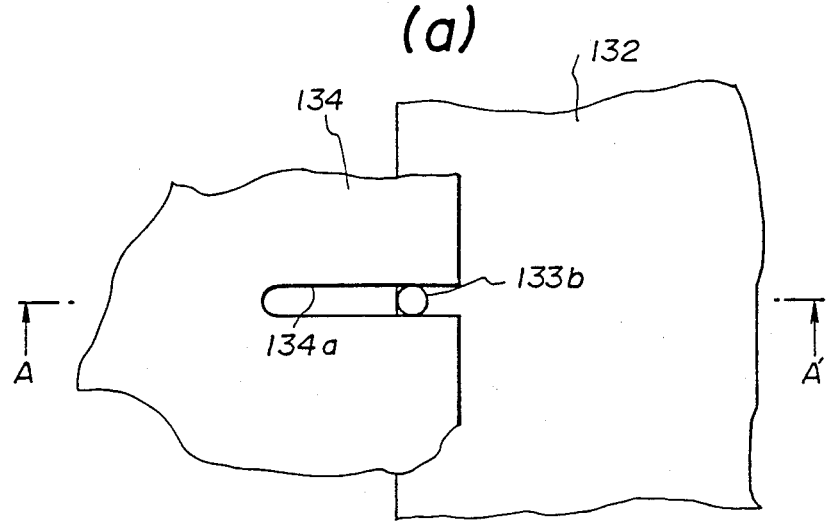
Figure 18:
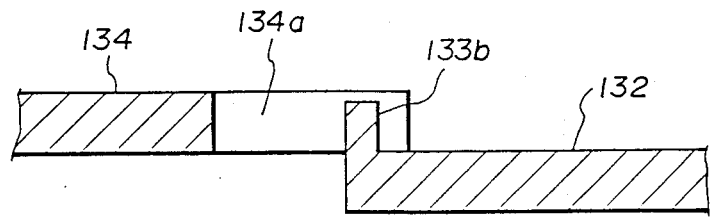

FIG. 17 is a plan view illustrating a relationship between the linear cam grooves 129-131 in the latter half 127 of the fixed cell 125 and the cam grooves 137-139 in the variable power cell 132. Each of the linear cam grooves 129-131 is formed as a long aperture along the direction of the optical axis, while each of the cam grooves 137-139 in the variable power cell 132 is formed as a long aperture of the shape along with the cam diagram determined upon design of the variable power lens group 102.

FIG. 18(a) and FIG. 18(b) show the connection portion between the variable power cell 132 and the variable power transmission cell 134 in an enlarged scale in which FIG. 18(a) is a plan view of the connection portion in FIG. 16 and a FIG. 18(b) is a cross sectional view taken along arrow A—A in FIG. 18(a).

In FIGS. 18(a) and 18(b), the recess 134a is a linear longitudinal aperture recessed along the optical axis 101 and the rotation transmission pin 133b is fitted into the recess 134a. Accordingly, the variable power transmission cell 134 is so adapted that its position is not regulated by the variable power cell 132 for the movement along the direction of the optical axis, but only the rotational movement of the variable power cell 132 is transmitted.

Figure 19:
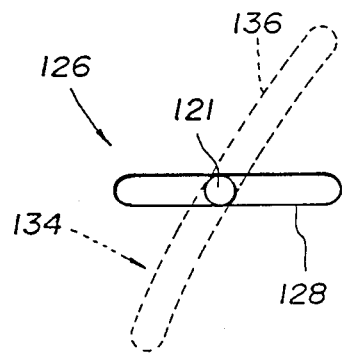

FIG. 19 is an enlarged plan view for the cam shape in each of the front half 126 of the fixed cell 125 and the variable power transmission cell 134, and the relationship therebetween, as viewed from the side of the focus transmission cell 140. The cam groove 136 of the variable power transmission cell 134 is formed as the shape along with the cam diagram determined upon design for the lens group 102. Accordingly, the first cell 117 is so adapted that it moves along the optical axis accompanying the rotational movement of the variable power transmission cell 134 to conduct variable power operation independently from the focusing operation.

Figure 20:
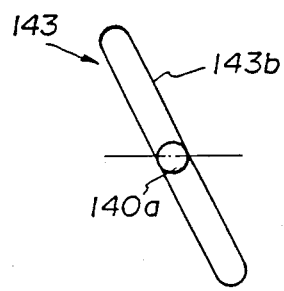

FIG. 20 is an enlarged plan view illustrating the shape of the cam groove 143b in the focus cell 143b and the directional relationship with the optical axis 101. As can be seen from the figure, the cam groove is formed in such a shape as making a predetermined inclination to the optical axis 101. Accordingly, the rotational movement of the focus cell 143 is converted into the linear movement of the focus pin 140a in the direction of the optical axis, that is, to the linear movement of the focus transmission cell 140 in the direction of the optical axis.

Figure 21:
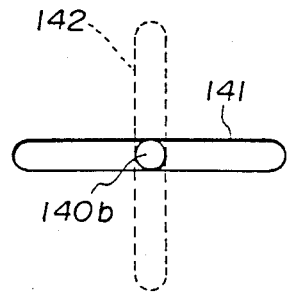

FIG. 21 is an enlarged plan view as viewed from the side of the focus cell 143 for illustrating the relationship between the focus cell 140, the front half 126 of the fixed cell 125 and the variable power transmission cell 134, as well as the shape of the respective cam grooves. The linear cam groove 141 in the front half 126 is formed as a linear long aperture along the direction of the optical axis. The cam groove 142 in the variable power transmission cell 134 is formed so as to be in perpendicular with the linear cam groove 141. That is, it is so constituted that the rotational movement of the variable power transmission cell 134 accompanying the variable power operation is not restricted by the focus pin 140b of the focus transmission cell 140. In FIG. 16, although the linear cam groove 128 and the linear cam groove 141 in the front half 126 of the fixed cell 125 are shown as if they are on the identical cross section for the sake of preparing the drawing, the linear cam groove 128 and the linear cam groove 141 are actually situated at different cross sections.

Figure 22:
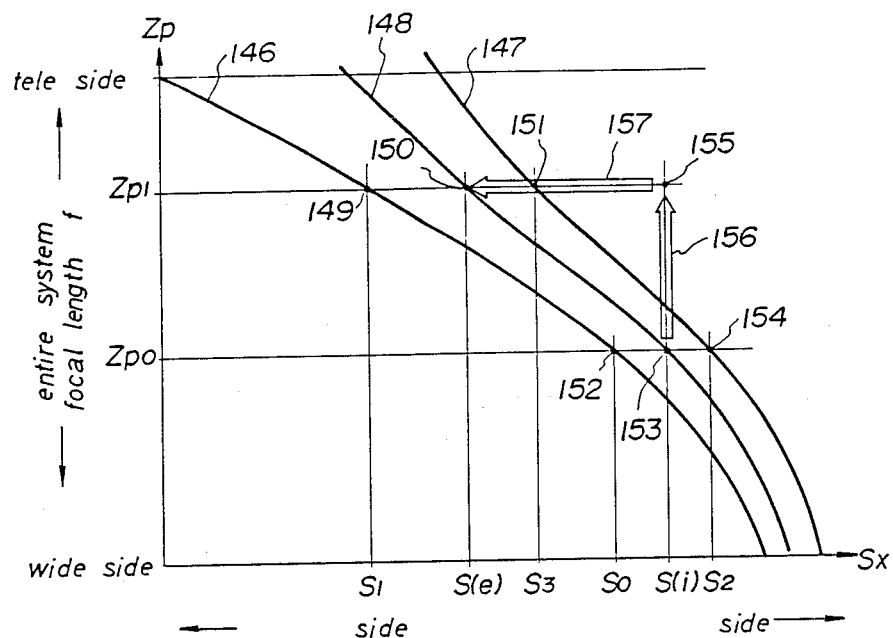
FIG. 22 is a graph for explanating the operation of the entire portion of the embodiment shown in FIG. 14.

FIG. 22 is a graph for explanating the operation of the embodiment shown in FIG. 14. In FIG. 22, reference numeral 146 represents an ∞ position cam corresponding curve of the first lens 102a shown in FIG. 15 corresponding to the cam diagram at ∞ position (hereinafter referred to simply as "∞ curve"), reference numeral 147 represents a nearest curve illustrating the change for the nearest position of the first lens (for example, corresponding to object distance D=1.2 m), 148 represents a focusing curve illustrating the change of the focus position for the focusing lens group 102a, 102b at an optional object distance D (for instance D=3.0 m, etc), that is, the change when the focal length is varied between the wide angle side and the telephoto side, reference numerals 149, 150 and 151 represent intersections between Zp=Zp1 and the curve 146, focusing curve 148 and the nearest curve 147 respectively and the values Sx for the intersections 149–151 correspond respectively to S1, S(e), S3. In the same manner reference numerals 152, 153 and 154 represent intersections between Zp=Zp0 and the curve 146, focusing curve 148 and the nearest curve 147, and values Sx for the intersections 152–154 correspond to S0, S(i), S2 respectively. Reference numeral 155 represents an intersection between Zp=Zp1 and Sx=S(i) and 156 denotes an arrow indicating the direction of the variable power drive, while 157 is an arrow showing the direction of the focusing drive.

Figure 23:
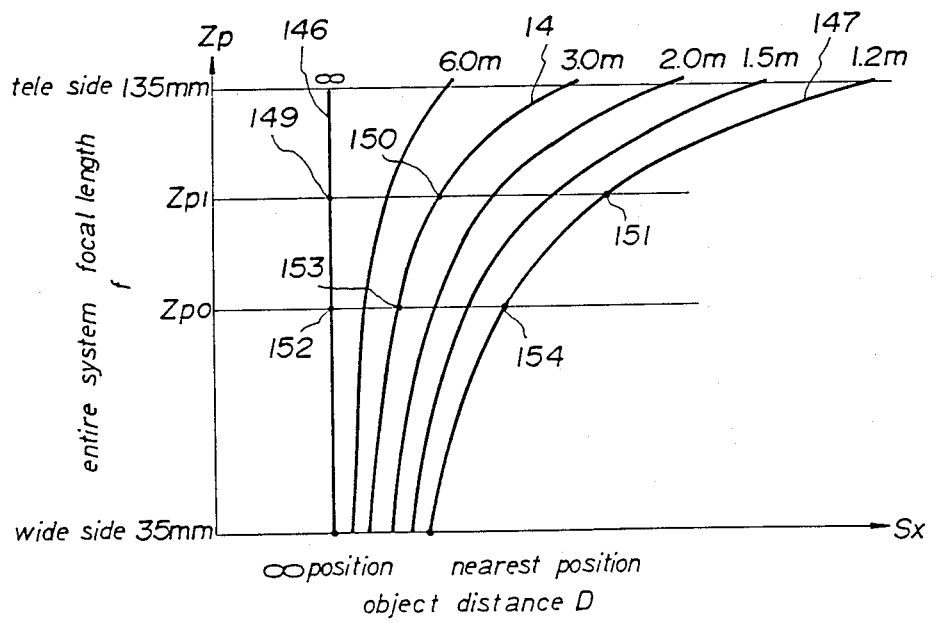
FIG. 23 is a graph in which the graph shown in FIG. 22 is approximated with respect to the configuration to the characteristics of another variable focal lens.

FIG. 23 is a graph for the ∞ curve 146, the focusing curve 148 and the nearest curve 147 in FIG. 22 drawn by standarizing at the ∞ position in view of the configuration for facilitating the comparison with the characteristics of other varifocal lenses. Those portions corresponding to FIG. 22 carry the same reference numerals and overlapped explanations will be saved.

The operation of the present embodiment having thus been constituted will now be explained.

Prior to the explanation for the entire control operation, the operation of the mechanical section shown in FIG. 16 will be explained. At first, the prime gear 145a is rotated by the variable power motor 145, to transmit the rotational movement to the gear portion 133a meshed therewith, by which the variable power cell 132, variable power transmission cell 134 connected with the rotation transmission pin 133b and the second lens 102b start to rotate integrally. As shown in FIGS. 19 and 17, the first cell 117 and the fifth cell 120 are put to positional regulation by the first pin 121 and the third pin 122-fifth pin 124 relative to the direction of the rotation by the linear cam grooves 128, 129, 130 and 131 extending along the direction of the optical axis respectively. Accordingly, the first pin 121 and the third pin 122-fifth pin 124 are moved on the optical axis due to the rotation of the variable power transmission cell 134 and the variable power cell 132 by the amount according to the rotational angle and the respective shpaes of the cam grooves 136–139. That is, the group of the lenses excepting the second lens 102b is put to the variable power effect and moved in accordance with the cam diagram shown by the solid lines in FIG. 15 respectively. The focal length f can be renewed by the variable power operation but, since the shift of focus also occurs, it has to be comensated. In view of the above, the focusing operation will be explained. The second lens 102b is not moved by the variable power operation described above.

The prime gear 144a is driven by the focus motor 144 and the rotational force is transmitted to the gear portion 143a of the focus cell 143 meshing with the prime gear 144a to rotate the focus cell 143. However, since the position of the focus pin 140b is regulated against the rotational direction by the linear cam groove 141 formed in the front half 126 of the fixed cell 125, the focus transmission cell 140 can neither be moved in the rotational direction as shown in FIG. 21. Accordingly, the focus pin 140a fitted into the cam groove 143b of the focus cell 143 makes a linear movement on the optical axis by the amount in accordance with the horizontal component to the rotational angle of the cam groove 143b. That is, the rotational movement of the focus cell 143 is transformed by way of the focus pin 140a into the linear movement of the focus transmission cell 140 along the direction of the optical axis and, further, the linear movement is transmitted by way of the focus pin 140b to the variable power transmission cell 134, and the entire variable power transmission cell 134 is moved on the optical axis to the focus position while keeping the first lens 102a and the second lens 102b apart by a lens distance set by the foregoing variable power operation (the second lens 102b is immovable in this case). As can be seen already from the explanation, the variable power transmission cell 134 contributes both to the variable power operation and to the focusing operation. Zp shown in FIG. 15 is the change of the output from ZPM 108 in the foregoing variable power operation and Sx shown in FIG. 15 is the change of the output from FPM 107 by the focusing operation.

Now, the entire control operation of the present embodiment will be explained mainly referring to FIG. 22 by the use of FIG. 14.

It is assumed that the position of the variable power lens group, that is, the output from the ZPM 108 as Zp=Zp0 and the position for the focusing lens group 102a, 102b, that is, the output from the FPM 7 as Sx=S(i). In this case, a power-up operation for renewing the entire system focal length f from the wide angle side to the telephoto side is started. When the up switch 113 in FIG. 14 is depressed, a start signal (STR) including the information for the direction of the variable power is outputted from the drive direction judging section 115. The maximum delivery amount calculation section 109 receives the output (Zp), from the ZPM 108 and applies A/D conversion thereto while the proportional constant calculation section 110 receives the output (Sx) from the FPM 107 and applies A/D conversion thereto. Then, the respective values are: Zp=Zp0 and Sx=S(i) as described above. In the case of varifocal lens having such characteristics as shown in FIG. 23 that the focus position for ∞ position does not change depending on the focal length f, the maximum delivery amount Fpx=Fp(i) at Zp=Zp0 can be determined according to the equation (42). That is, this is the length from the intersection 152 to intersection 154 in FIG. 23. Accordingly, also in FIG. 22 for the present embodiment, the length from the intersection 152 to the intersection 154 can be determined according to the equation (42) as the maximum delivery amount Fpx (=FP(i)). Furthermore, the maximum delivery amount calculation section 109 calculates the position (coordinate) for the intersection 152 of the ∞ curve 146 at Zp=Zp0 according to the equation (43) as: $Sx(\infty) = S_0$. Then, the proportional constant calculation section 110 calculates the proportional constant Cfp based on $S_0$, the maximum delivery amount Ffp(i), as well as Sx=S(i) and the equation (44).

Then, the variable power motor Mz is started in the direction of power up by the information for the variable power direction and the start signal (STR) as described above. The variable power lens group moves in the direction of the arrow 156 in FIG. 22 and, if the up switch 113 turns OFF at the point reaching the intersection 155, the variable power control section 116 stops the variable power motor Mz. At this instance, since Zp=Zp1 and the focus motor $M_F$ has not yet been started, it is still in the state: Sx=S(i). In this case, the maximum delivery amount calculation section 109 receives Zp=Zp1, calculates the maximum delivery amount: Fpx=Fp(e) which is the length from the intersection 149 to the intersection 151 and, further, calculates the Sx coordinate for the intersection 149 on the $\infty$ curve 146 according to the equation (2) as Sx($\infty$)=S$_1$. Then, the focusing compensation calculation section 111 calculates a forecast focus position S(e) shown by the intersection 150 in accordance with S$_1$, previously determined proportional constant Cfp and Fp(e), and the equation (45). Then, the focus control section 112 controls the focus motor $M_F$ so as to drive the focusing lens group 102a, 102b in the direction shown by the arrow 157 in FIG. 22, monitors the output Sx from the FPM 107 which is changed by them by way of the focusing compensation calculation section 111, stops the focus motor $M_F$ at the time when the output Sx is: Sx=S(e) to complete the power up operation. Further, the power down operation can be conducted by the procedures just opposite to those described above and the explanations therefor are omitted since the power down operation can easily be recognized.

In this way, in the present embodiment, since the second lens 102b is fixed to the variable power transmission cell 134, the verifocal lens which is of a simple optical system can further be simplified.

Further, since the second lens 102b is fixed to the variable power transmission cell 134, the cell for use in the second lens can be saved and, further, there is no requirement of forming a cam groove which is difficult to be fabricated in the variable power transmission cell 134 and, accordingly, it is possible to simplify the structure and reduce the cost. In addition, since there is no requirement for driving the second lens 102b in the variable power operation the frictional force can be moderated by so much and, accordingly, the driving loss can be reduced as well.

The present invention is no way limited only to the embodiments as described above but it can be modified into various ways without departing the scope of the invention.

For instance, the cell fixed to the variable power transmission cell 134 may be the first cell 117.

Further, although the variable power transmission cell 134 concerns both to the variable power operation and to the focusing operation, the focus counter 106 and the FPM 107 are not restricted only to such an embodiment as shown in FIG. 16 adapted to be connected with the prime gear 144a, but it may be so adapted that the moving amount of the focus cell 143 and the focus transmission cell 140 in the direction of the optical axis may be detected.

Further, the ZPM 108 is not limited only to such an embodiment as connected with the prime gear 145a, but it may be so constituted that the rotational angle of the variable power cell 132 or variable power transmission cell 134, or the moving amount of any one of the third cell 118—fifth cell 120 in the direction of the optical axis may be detected.

Further, the focus motor 144 and the variable power motor 145 may be driven by way of speed reduction mechanism, etc. with no direct coupling to the prime gears 144a and 145a.

Further, the forecast focusing position S(e) may be compared not only with the output Sx from the FPM 107 but it may also be compared with the output Dfc from the focus counter 106, that is, the focus motor $M_F$ may be stopped at the time Sx=Dfc.

In the case of constituting the FPM 107 with a potentiometer and the focus counter 106 with a rotary encoder, etc., since the focus counter 106 can generally provide higher accuracy, the above-mentioned case has a merit that the more accurate driving can be attained for the forecast focusing position S(e).

Furthermore, the calculation according to the equation (43) may be conducted, for example, by dividing the $\infty$ curve 146 in FIG. 22 into four sections depending on the value for Zp, approximating the four sections with linear lines and calculating Sx($\infty$) in accordance with the approximate equations for the respective sections. For instance, if setting the value for Zp which is quantified into integers corresponding to f=35 mm as 0, the value for Zp corresponding to f=135 mm as 31, the value for Fp corresponding to the nearest position as 0 and the value for Fp corresponding to $\infty$ position as 31, the approximate equations for the respective sections ①-④ can be expressed as below:

① $Zp \leq 3$ $\quad Fp = 31$

② $4 \leq Zp \leq 7$ $\quad Fp = 29 - \frac{2}{4}(Zp - 4)$

③ $8 \leq Zp \leq 15$ $\quad Fp = 27 - \frac{6}{8}(Zp - 8)$

④ $16 \leq Zp \leq 31$ $\quad Fp = 21 - \frac{21}{6}(Zp - 16)$

Furthermore, the equation (42) and the equation (43) may be in the form of a calculation formula of Taylor's development such as: $Fpx = a_0 + a_1 Zp + a_2 Zp^2 - - -$ In this case, $a_0, a_1, a_2, - - -$ are predetermined constants prepared upon design.

In addition, the equation (42) and the equation (43), etc. are utilized not merely by the calculation but by storing the relevant data to the inside of CPU, ROM, etc.

What is claimed is:

1. A variable focal lens device having an optical system comprising a variable power lens group and a focusing lens group disposed on one identical optical axis in which a deviation of a focusing position is resulted from an identical object when the focusing lens group is set at a predetermined focusing position from a nearest position to an infinite position on the optical axis corresponding to an object distance from a nearest distance to an infinite distance and then moving said variable power lens group along the optical axis thereby renewing an entire system focal length of said variable power optical system from a first focal length to a second focal length wherein said device comprises;
   a focal length detection means for detecting said entire system focal length,
   a focusing lens group position detection means for detecting a position of said focusing lens group on said optical axis, a maximum delivery amount computing means for receiving an output from said focal length detection means and computing a delivery amount of said focusing lens group from said infinite position to said nearest position for said entire system focal length, a proportional constant computing means for receiving outputs from said maximum delivery amount computing means and from said focusing lens group position detection means respectively and computing a ratio between said outputs, a focusing compensation calculation means for receiving outputs from said proportional constant computing means, from said maximum delivery amount computing means and from said focusing lens group position detection means respectively, and calculating an amount of deviation of the focusing position from the focusing position resulted from the renewal of said entire system focal length as a compensation value, a focusing drive means for driving said focusing lens group, a moving amount monitor means for generating a signal corresponding to the moving amount of said focusing lens group, a focusing control means for receiving outputs from said moving amount monitor means and from said focusing compensation calculation means respectively and driving said focusing lens group to said focusing position, a variable power drive means for driving the variable power lens group, and a variable power control means for receiving a start signal from a start means and controlling said variable power drive means, the deviation of the focusing position due to the renewal of the entire system focal length of said optical system being automatically compensated.

2. The device as defined in claim 1, wherein the maximum delivery amount computing means executes a calculation for the following formula:

$$Fpx = \frac{C_2}{Zp + C_1} + C_3 \quad (1)$$

where Fpx is an output corresponding to the delivery amount from the infinite position to the nearest position, Zp is an output from the focal length detection means and $C_1$, $C_2$, $C_3$ represent respectively constants inherent to the lenses of the variable power optical system.

3. The device as defined in claim 1, wherein the proportional constant computing means executes a calculation for the following formula:

$$Cfp = \frac{S(i)}{Fp(i)} \quad (2)$$

where S(i) is an output from the focusing lens group position detection means just before starting the operation of the variable power drive means, Cfp is an output from said proportional constant computing means and Fp(i) is an output from the maximum delivery amount computing means just before starting the operation of said variable power drive means.

4. The device as defined in claim 1, wherein the focusing compensation calculation means executes a calculation for the following formula:

$$Dfp = Cfp\left(\frac{C_2}{Zp(e) + C_1} + C_3\right) - S(i) \quad (3)$$

at predetermined time intervals after starting the operation of the variable power drive means or when the output from said focal length detection means reaches a predetermined amount, where Dfp is an output from said focusing compensation calculation means, Cfp is an output from the proportional constant computing means, Zp(e) is an output from the focal length detection means at the instance to be compensated, S(i) is an output from the focusing lens position detection means at the instance just before starting the operation and $C_1$, $C_2$, $C_3$ are the constants inherent to the lenses of the variable power optical system.

5. The device as defined in claim 1, wherein the focusing control means operates the focusing drive means based on the output Dfp from the focusing compensation calculation means and interrupts the operation of said focusing drive means at the instance where the output from the moving amount monitor means becomes identical with the output Dfp.

6. A variable focal lens device having an optical system comprising a variable power lens group and a focusing lens group disposed on an identical optical axis in which a deviation of a focusing position is resulted from an identical object when the focusing lens group is set to a predetermined focusing position from a nearest position to an infinite position on the optical axis corresponding to an object distance from a nearest distance to an infinite distance and then moving said variable power lens group thereby renewing an entire system focal length of the optical system from a first focal length to a second focal length, wherein the device comprises:

a focal point detection means for detecting a focal point adjusting state of said focusing lens group to said object, a focusing control means for driving the focusing lens group so as to focus on the object based on an output from the focal point detection means, a variable power lens group position detection means for detecting a position of said variable power lens group driven by a variable power drive means on said optical axis corresponding to said entire system focal length, a focusing lens group position detection means for detecting a position of said focusing lens group on said optical axis corresponding to said object distance, a central position computing means for computing a central position of said focusing lens group between said nearest position and said infinite position at the entire system focal length thereby outputting a signal corresponding to the central position when detecting a focal point by said focal point detection means is impossible, and a judging means for judging a relative relationship between the position of said focusing lens group and said central position based on an output from said focusing lens group position detection means and an output from said central position computing means, thereby instructing said focusing control means to drive said focusing lens group toward a near distance side in a case where said focusing lens group is situated on a far distance side with respect to said central position, while toward a far distance side in a case where said focusing lens group is situated on a near distance side with respect to said central position.

7. The device as defined in claim 6, wherein the central position computing means comprises a maximum delivery amount computing means that executes the calculation for the following formula:

$$Fpx = \frac{C_2}{Zp + C_1} + C_3$$

where Fpx is an output corresponding to a delivery amount of said focusing lens group from the infinite position to the nearest position, Zp is an output from the variable power lens group position detection means, $C_1$, $C_2$, $C_3$ are constants inherent to the lenses of the variable power optical system, and calculates the central position by the equation:

$$Fp(c) = \frac{Fpx}{2}$$

where Fp(c) is the output from said central position computing means.

8. The device as defined in claim 6, wherein the judging means comprises a proportinal constant computing means and a focusing compensation calculation means in which the proportional constant computing means executes the calculation for the following formula:

$$Cfp = \frac{S(i)}{Fp(i)}$$

where S(i) is an output from the focusing lens group position detection means just before starting the operation of the variable power drive means, Cfp is an output from said proportional constant computing means and fp(i) is an output from the maximum delivery amount computing means just before starting the operation of the variable power drive means and further, the focusing compensation calculation means executes the calculation for the following formula:

$$Dfp = Cfp \left( \frac{C_2}{Zp(e) + C_1} + C_3 \right) - S(i)$$

at predetermined time intervals after starting the operation of the variable power drive means or when the output from said variable power lens position detection means reaches a predetermined amount, where Dfp is an output from the focusing compensation calculation means, Cfp is an output from the proportional constant computing means, Zp(e) is an output from variable power lens group position detection means at the instance to be compensated, S(i) is an output from the focusing lens group position detection means at the time just before starting the operation and $C_1$, $C_2$, $C_3$ are the constants inherent to the lenses of the variable power optical system.

9. A variable focal lens device having a variable power optical system comprising a variable power lens group and a focusing lens group disposed on one identical optical axis, in which a deviation of a focusing position with respect to an identical object is resulted from conducting a focusing operation for setting said focusing lens group at a focusing position on said optical axis between a nearest position and an infinite position corresponding to an object distance from a nearest distance to an infinite distance and then conducting a zooming operation for moving said variable power lens group along said optical axis in order to change an entire system focal length of said variable power optical system from a first focal length to a second focal length, wherein said variable power lens group comprises a plurality of lens groups each adapted to be moved along said optical axis upon conducting said zooming operation, said focusing lens group comprises at least two lens groups adapted to change an interval therebetween upon conducting said zooming operation in interlock with a movement of said variable power lens group and to be moved upon conducting said focusing operation along said optical axis, and said variable focal lens device comprises:

first position detecting means for detecting and outputting a signal indicative of a position of said variable power lens group on said optical axis, second position detecting means for detecting and outputting a signal indicative of a position of said focusing lens group on said optical axis, and position control means for moving said variable power lens group upon conducting said zooming operation, computing a deviation of a focusing position resulted from conducting said zooming operation on the basis of said two signals received from said first and second position detecting means respectively, and moving said focusing lens group by a distance corresponding to said computed deviation.

10. A device according to claim 9, wherein said position control means comprises a memory for storing two signals respectively outputted from said first and second position detecting means just before conducting said zooming operation, and said position control means is adapted to compute deviation on the basis of said two signals stored in said memory and two signals respectively outputted from said first and second position detecting means just after conducting said zooming operation.

* * * * *